(12) United States Patent
Peloquin, Jr. et al.

(10) Patent No.: US 11,999,224 B2
(45) Date of Patent: Jun. 4, 2024

(54) TOTAL TASK VEHICLE

(71) Applicant: BLACK & DECKER INC., New Britain, CT (US)

(72) Inventors: Ryan H. Peloquin, Jr., Ellicott City, MD (US); Daniel J. White, Baldwin, MD (US); Matthew J. Velderman, Baltimore, MD (US); Andrew E. Seman, Jr., Pylesville, MD (US); Christopher Lemieux, Mount Airy, MD (US); Harry Zhong, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 233 days.

(21) Appl. No.: 17/323,062

(22) Filed: May 18, 2021

(65) Prior Publication Data

US 2021/0339615 A1    Nov. 4, 2021

Related U.S. Application Data

(63) Continuation of application No. 16/883,446, filed on May 26, 2020, now Pat. No. 11,247,549, which is a
(Continued)

(51) Int. Cl.
*H01M 50/249* (2021.01)
*B60K 1/00* (2006.01)
(Continued)

(52) U.S. Cl.
CPC .................. *B60K 1/00* (2013.01); *B60K 1/04* (2013.01); *B60K 17/04* (2013.01); *B60K 17/28* (2013.01); *B60K 25/00* (2013.01); *B60K 25/08* (2013.01); *B60L 50/64* (2019.02); *B60L 53/30* (2019.02); *B60M 1/02* (2013.01); *B60R 16/0238* (2013.01);
(Continued)

(58) Field of Classification Search
None
See application file for complete search history.

(56) References Cited

U.S. PATENT DOCUMENTS 3,713,502 A    1/1973  Delaney et al.
4,117,900 A    10/1978 Amick
(Continued)

OTHER PUBLICATIONS

International Search Report and Written Opinion, PCT Application No. PCT/US2017/059546, Jan. 25, 2018, 8 pages, USPTO.
(Continued)

*Primary Examiner* — Arun C Williams
(74) *Attorney, Agent, or Firm* — Michael Aronoff

(57) ABSTRACT

A total task vehicle (TTV) may operate indoors to move a variety of different types of materials and accomplish a variety of different types of tasks, using tools and accessories powered by/connected to the TTV. One or more high power density (HD) battery packs may provide both 240V DC to 380V DC and 120V AC power to propel the TTV and also to function as a generator for tools and accessories attached to the TTV. A high torque/high speed convertible drive system may allow the TTV to operate in a ride-on mode, a walk-behind mode, providing for flexibility and adaptability in use of the TTV.

20 Claims, 32 Drawing Sheets

Related U.S. Application Data continuation of application No. 16/400,511, filed on May 1, 2019, now abandoned, which is a continuation of application No. PCT/US2017/059546, filed on Nov. 1, 2017.

(60) Provisional application No. 62/417,827, filed on Nov. 4, 2016.

(51) Int. Cl.

| | | |
|---|---|---|
| *B60K 1/04* | (2019.01) | |
| *B60K 17/04* | (2006.01) | |
| *B60K 17/28* | (2006.01) | |
| *B60K 25/00* | (2006.01) | |
| *B60K 25/08* | (2006.01) | |
| *B60L 50/64* | (2019.01) | |
| *B60L 53/30* | (2019.01) | |
| *B60M 1/02* | (2006.01) | |
| *B60R 16/023* | (2006.01) | |
| *H02J 3/00* | (2006.01) | |
| *H02J 7/00* | (2006.01) | |

(52) U.S. Cl.
CPC ........... *H01M 50/249* (2021.01); *H02J 3/008* (2013.01); *H02J 7/0013* (2013.01); *B60K 2001/0461* (2013.01); *B60K 2025/005* (2013.01); *B60Y 2200/223* (2013.01); *B60Y 2200/225* (2013.01); *H01M 2220/20* (2013.01); *H01M 2220/30* (2013.01)

(56) References Cited

U.S. PATENT DOCUMENTS

| | | | |
|---|---|---|---|
| 4,285,311 A * | 8/1981 | Iio | F02B 25/14 |
| | | | 123/73 V |
| 4,759,560 A | 7/1988 | Virgulti | |
| 5,111,127 A | 5/1992 | Johnson | |
| 6,751,109 B2 | 6/2004 | Doss et al. | |
| 7,445,070 B1 * | 11/2008 | Pickering | B62D 61/08 |
| | | | 180/215 |
| 7,832,513 B2 | 11/2010 | Verbrugge et al. | |
| 9,511,655 B1 | 12/2016 | Marzocca et al. | |
| 2003/0029149 A1 | 2/2003 | Fillman et al. | |
| 2003/0102657 A1 * | 6/2003 | Kuo | B62J 17/08 |
| | | | 180/219 |
| 2004/0035625 A1 | 2/2004 | Talbot et al. | |
| 2004/0050611 A1 | 3/2004 | Kamen et al. | |
| 2005/0156564 A1 | 7/2005 | Krieger | |
| 2006/0048601 A1 | 3/2006 | Chiao | |
| 2006/0175109 A1 * | 8/2006 | Cheng | B62H 1/12 |
| | | | 180/219 |
| 2007/0256882 A1 * | 11/2007 | Bedard | B62K 5/027 |
| | | | 180/312 |
| 2009/0283343 A1 | 11/2009 | Wurth | |
| 2010/0065344 A1 | 3/2010 | Collings, III | |
| 2010/0314179 A1 | 12/2010 | Gibson | |
| 2010/0320023 A1 * | 12/2010 | Rhodig | B60K 1/04 |
| | | | 180/311 |
| 2011/0253463 A1 | 10/2011 | Smith | |
| 2012/0098220 A1 * | 4/2012 | Yu | B62K 5/08 |
| | | | 280/62 |
| 2012/0103710 A1 | 5/2012 | Atsuchi et al. | |
| 2012/0146386 A1 | 6/2012 | Rowlands | |
| 2012/0176086 A1 | 7/2012 | Nakamura et al. | |
| 2012/0201015 A1 | 8/2012 | Robertson et al. | |
| 2012/0207620 A1 * | 8/2012 | Dalum | B60W 20/40 |
| | | | 903/903 |
| 2013/0090795 A1 | 4/2013 | Luke et al. | |
| 2013/0214706 A1 | 8/2013 | Flomenhoft | |
| 2014/0319907 A1 | 10/2014 | Yamazaki | |
| 2016/0242356 A1 | 8/2016 | Velderman et al. | |
| 2016/0318421 A1 | 11/2016 | Healy | |
| 2016/0347397 A1 | 12/2016 | Etzelsberger et al. | |
| 2020/0207225 A1 | 7/2020 | Barbosa, Jr. et al. | |

OTHER PUBLICATIONS

International Preliminary Report on Patentability, PCT Application No. PCT/US2017/059546, May 7, 2019, 7 pages, USPTO.

* cited by examiner

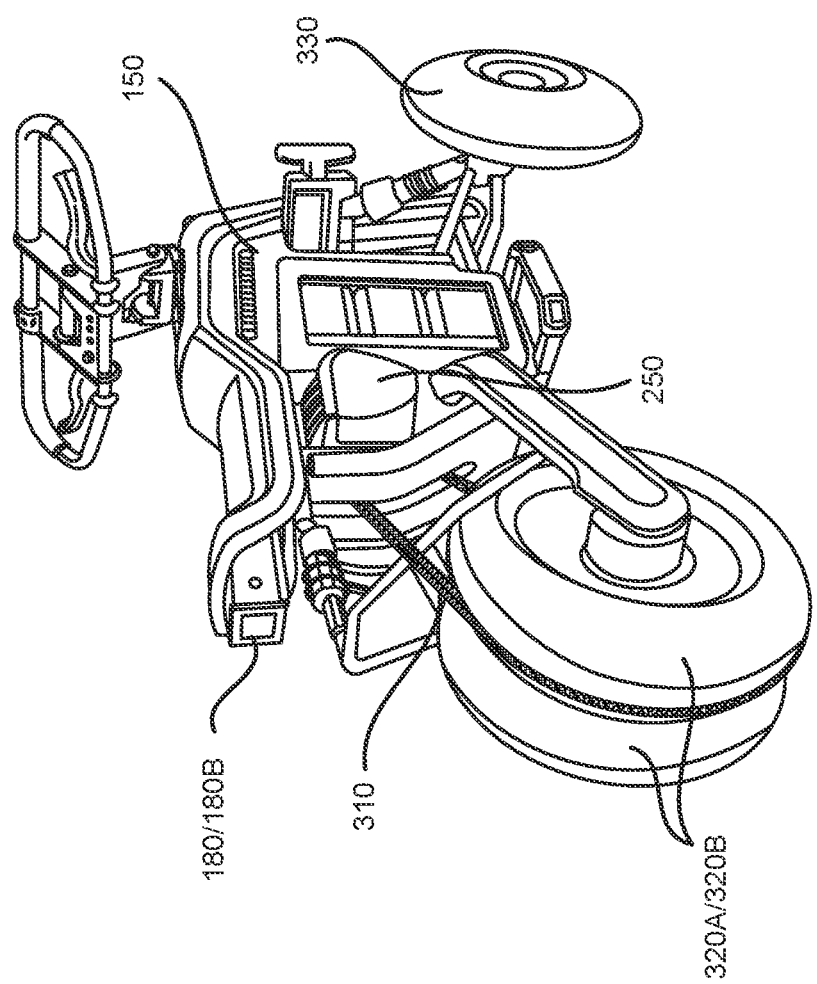

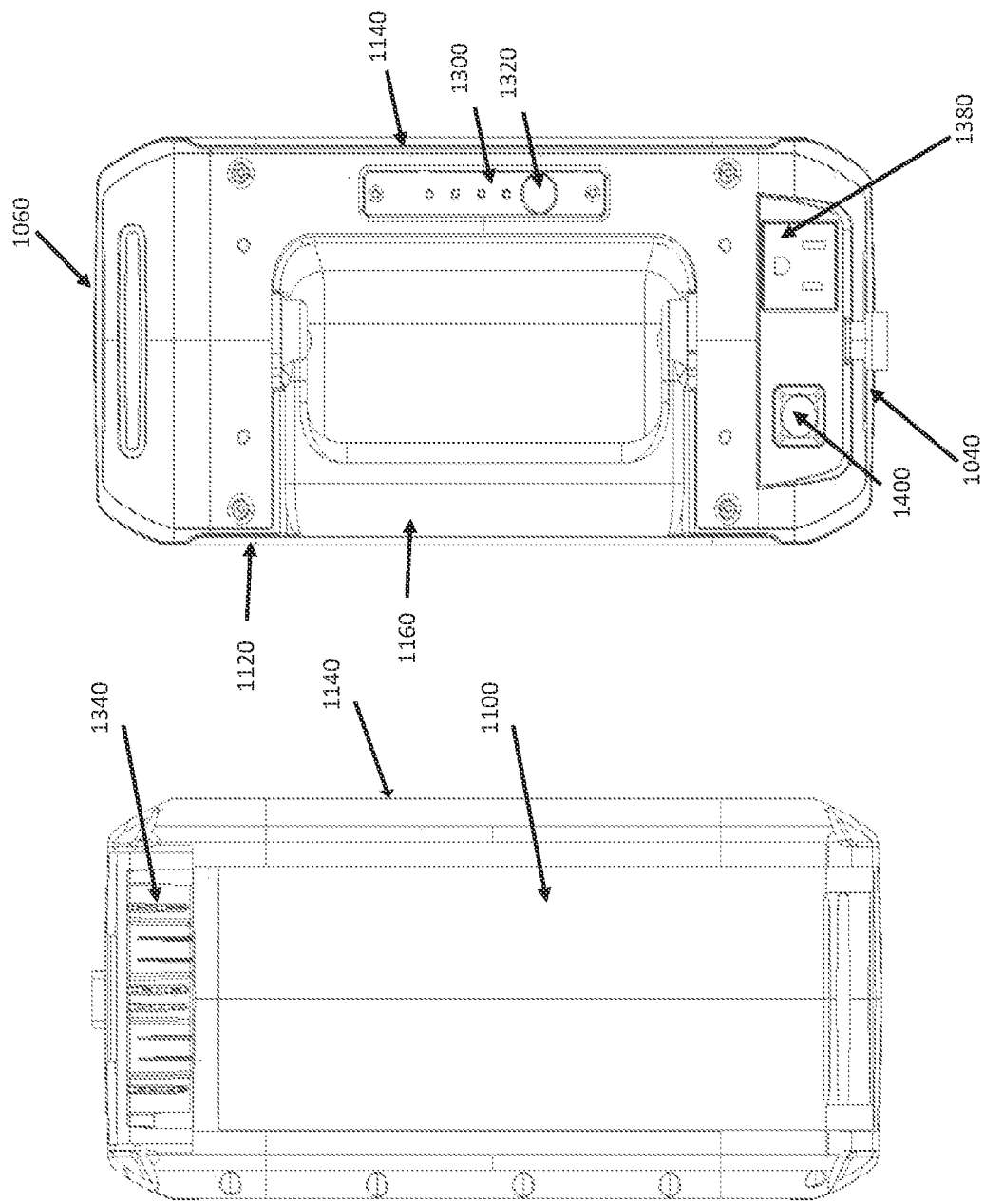

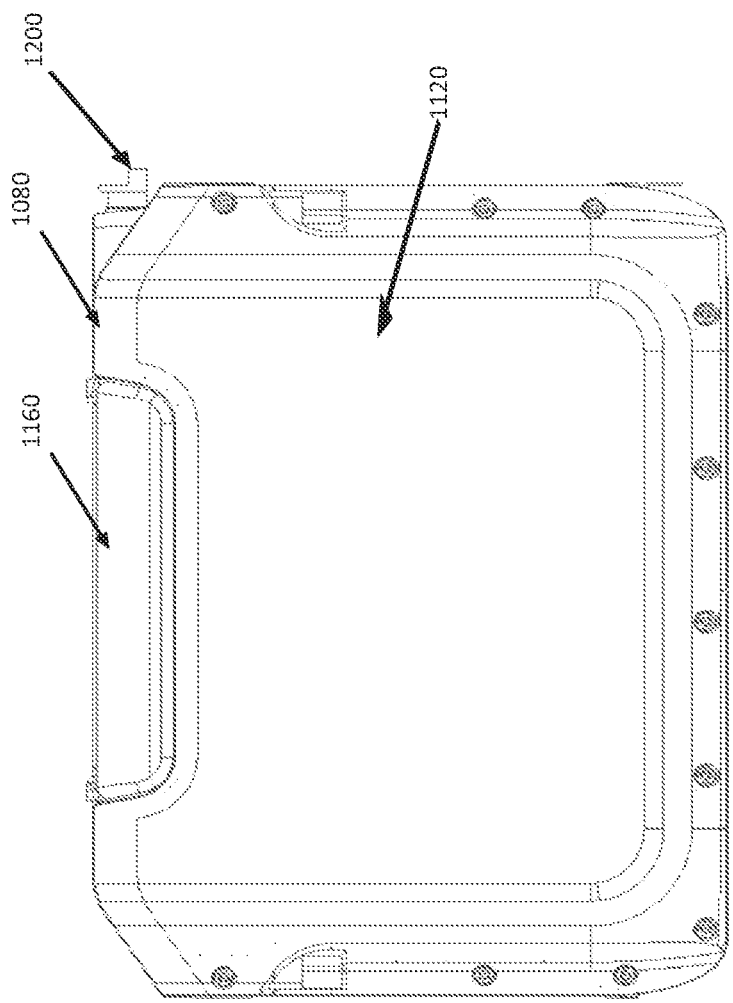
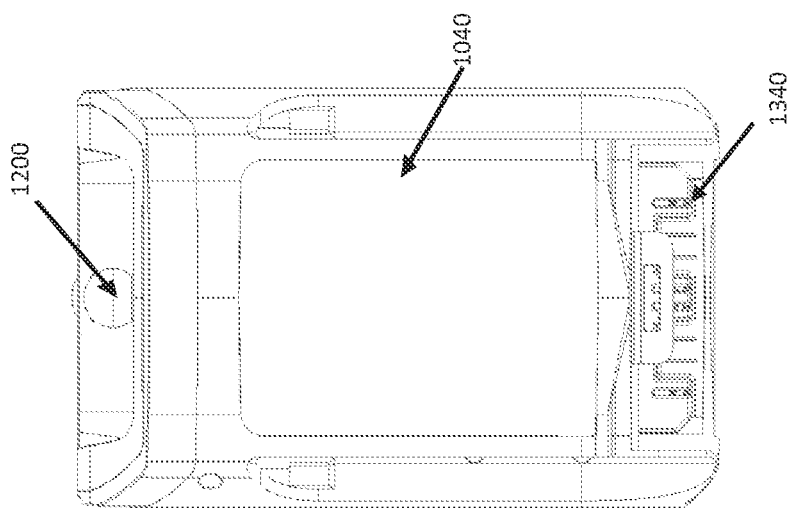
FIG. 3F
FIG. 3E

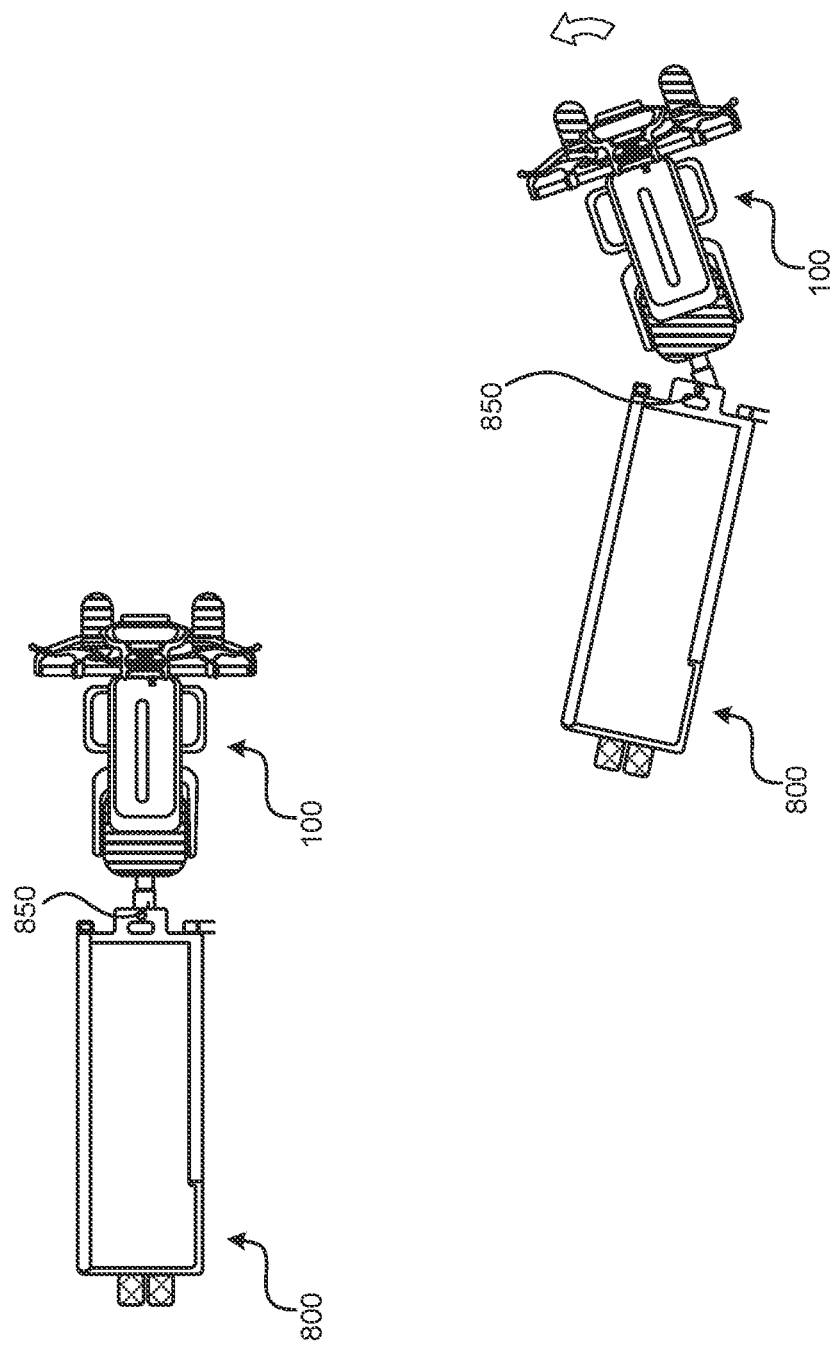

TOTAL TASK VEHICLE

CROSS REFERENCE TO RELATED APPLICATIONS

This application is a continuation of, and claims priority to, U.S. patent application Ser. No. 16/883,446, filed on May 26, 2020 which is a continuation of and claims priority to U.S. patent application Ser. No. 16/400,511 filed May 1, 2019, which is a continuation of and claims priority to PCT Application No. PCT/US17/59546, filed on Nov. 1, 2017, which claims priority to U.S. Provisional Application No. 62/417,827, filed on Nov. 4, 2016, the disclosures of which are all incorporated herein by reference in their entirety.

FIELD

This document relates, generally, to portable high-output construction equipment, and in particular, to portable high-output construction equipment that is configurable for multiple tasks.

BACKGROUND

Portable high-output construction equipment and/or tools, powered material movers, and other such equipment may be used, for example in industrial settings such as factories, warehouses and the like, commercial settings such as stores, storage facilities and the like, construction settings, and other settings, to transport equipment and/or materials and/or people, perform tasks on-site, and the like. This equipment may be subject to Operational Safety and Health Administration (OSHA) standards, banning the indoor use of gas powered equipment. This restriction on the indoor use of this type of gas powered equipment may severely impact the ability to complete a required task in an available amount of time and/or funding, and/or with available equipment and/or operators, without significant work arounds.

SUMMARY

In one aspect, a vehicle may include a frame, an electric motor coupled to the frame, at least one battery pack received in a receptacle in the frame, a first axle and a second axle coupled to the frame, a first wheel assembly and a second wheel assembly coupled to opposite end portions of the first axle, a third wheel assembly coupled to the second axle, a power transmission device coupled between the electric motor and at least one of the first axle or the second axle and configured to transmit a force generated by the motor to the at least one of the first axle or the second axle, and a plurality of powered attachment ports provided on the frame. Each of the plurality of powered attachment ports is configured to be mechanically and electrically coupled with a piece of accessory equipment, and each of the plurality of powered attachment ports are configured to selectively receive power from the at least one battery pack to provide output power at a voltage of at least 120V alternating current (AC) or at least 380V direct current (DC) to the piece of accessory equipment coupled thereto.

In some implementations, the at least one battery pack includes a first high power density (HD) battery pack, a second HD battery pack, and a third HD battery pack carried on the frame.

In some implementations, the first, second and third HD battery packs are configured to output 240V DC to 380V DC power to the electric motor, and to simultaneously output 240V DC to 380V DC power to one or more powered attachment ports of the plurality of powered attachment ports based on detection of a powered piece of accessory equipment coupled to the one or more of the plurality of powered attachment ports.

In some implementations, the vehicle also includes a plurality of power sockets on the first, second and third HD battery packs, wherein the first, second and third HD battery packs are configured to output 120V AC power to one or more power sockets of the plurality of power sockets based on detection of a plug, connected to a piece of equipment, received in the one or more power sockets.

In some implementations, the first, second and third HD battery packs are configured to output AC power to the one or more power sockets, and to simultaneously provide DC power to the electric motor via the power transmission device or to the one or more powered attachment ports.

In some implementations, the at least one battery pack is a high power density (HD) battery configured to output 240V DC to 380V DC power in a first mode, and to output 120V AC power in a second mode.

In some implementations, the at least one battery pack is configured to output 240V DC to 380V DC power to the engine, and is configured to simultaneously and selectively provide 240V DC to 380V DC power or 120V AC power to each of the plurality of attachment ports based on an identification of the piece of accessory equipment respectively coupled therein.

In some implementations, the vehicle also includes at least one power socket on the at least one battery pack or on the frame, wherein the at least one power socket is configured to receive a plug therein, and to provide 120V AC power to a piece of equipment connected to the plug.

In some implementations, the at least one battery pack includes a plurality of high power density battery packs, and, in a first mode, each battery pack of the plurality of battery packs is dedicated to supplying one of AC power or DC power, and in a second mode, DC power is drawn simultaneously from multiple battery packs of the plurality of battery packs, and the supply of DC power from one or more of the multiple battery packs of the plurality of battery packs is interrupted in response to a demand for AC power.

In some implementations, the vehicle also includes a control panel coupled to the frame, the control panel including a plurality of manipulation devices configured to receive user inputs for controlling operation of the vehicle and operation of accessories attached to the vehicle at the plurality of powered attachment ports.

In some implementations, the vehicle is operable in a riding mode in which the user is received on a seat positioned on the frame, and in a walk-behind mode in which the vehicle is configured to be operated by the user walking adjacent to the vehicle.

In some implementations, the control panel is rotatably coupled to the frame such that a rotation of the control panel, from a first position relative to the frame to a second position relative to the frame, triggers a conversion from operation of the vehicle in the riding mode to operation of the vehicle in the walk-behind mode.

In some implementations, in the riding mode, the motor is configured to operate in a high speed/low torque mode, in a high speed/high torque mode, in a low speed/low torque mode, or in a low speed/high torque mode, in response to a user input received at the control panel.

In some implementations, in the walk-behind mode, the motor is configured to operate in a low speed/high torque mode, or in a low speed/low torque mode, in response to a user input received at the control panel.

In some implementations, the vehicle also includes a towing adapter configured to mount the vehicle to a hitch attachment of a transport vehicle, the towing adapter including first end configured to be received in one of the plurality of powered attachment points, and a second end configured to be received in the hitch attachment of the transport vehicle.

In some implementations, the towing adapter includes a latching mechanism configured to engage in response to insertion of the second end of the towing adapter into the hitch attachment of the transport vehicle.

In some implementations, with second end of the towing adapter inserted into the hitch attachment of the transport vehicle and the latching mechanism engaged, the vehicle is suspended from the hitch attachment of the transport vehicle.

In some implementations, with second end of the towing adapter inserted into the hitch attachment of the transport vehicle and the latching mechanism engaged, the vehicle, only the third wheel assembly contacts the ground, wherein rotation of the third wheel assembly in response to towing movement of the transport vehicle produces regenerative charging of the at least one battery.

In some implementations, the frame, first and second wheel assemblies coupled to the first axle, and the third wheel assembly coupled to the second axle, define a three-wheeled cantilevered suspension system.

In some implementations, in a ride-on mode of the vehicle, a seat configured to receive a user seated thereon is positioned such that the first axle and first and second wheel assemblies coupled thereto are located at a forward end portion of the vehicle, and the second axle and the third wheel assembly coupled thereto are positioned at an aft end portion of the vehicle.

The details of one or more implementations are set forth in the accompanying drawings and the description below. Other features will be apparent from the description and drawings, and from the claims.

BRIEF DESCRIPTION OF THE DRAWINGS

FIGS. 1A and 1C-1E are rear views of a total task vehicle (TTV)

FIG. 3C is a bottom plan view, FIG. 3D is a top plan view, FIG. 3E is a front plan view, and FIG. 3F is a side view, of an exemplary battery pack, in accordance with implementations described herein.

FIGS. 10A-10D illustrate attachment of an exemplary material moving cart to a TTV, in accordance with implementations described herein.

DETAILED DESCRIPTION

Figure 1A:
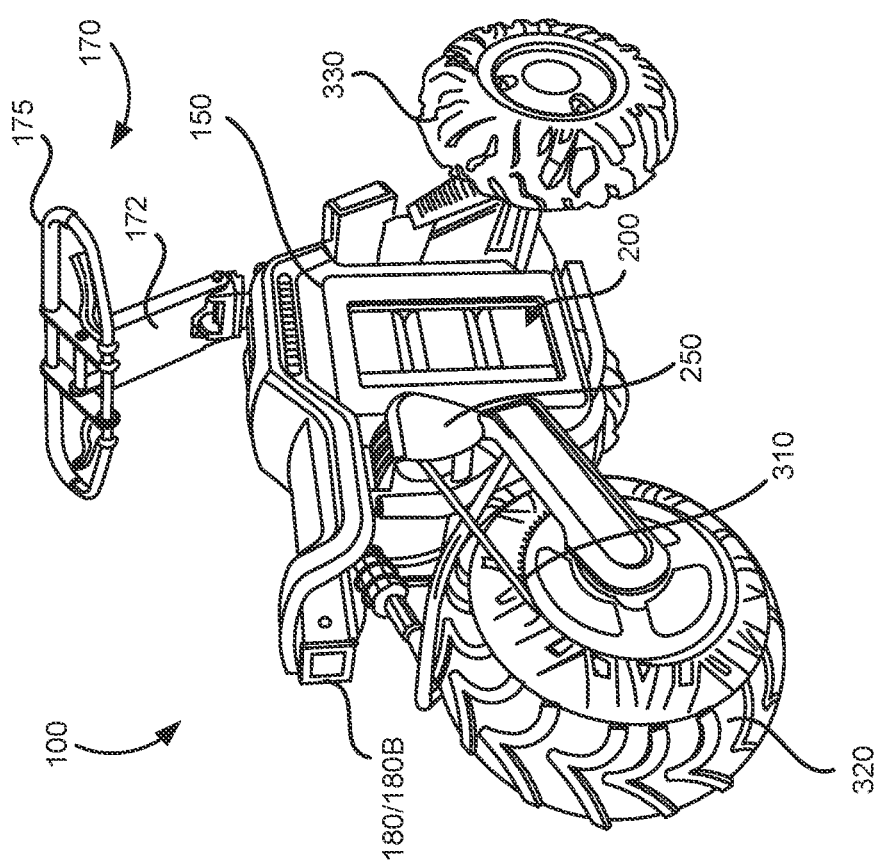

Restrictions on the indoor use of gas powered generators, high-output equipment and tools, equipment movers and the like may force heavy work involving this type of equipment to be conducted outdoors, and/or may necessitate extension cords to be run from an outdoor, gas powered generator to a piece of electrical equipment to be used indoors, and/or may necessitate the manual movement of materials, equipment and the like from an outdoor work station to an indoor work site. While these work-arounds may address the issue of operation of gas powered equipment indoors, these work-arounds may impact the efficiency and effectiveness in completing a particular task.

Additionally, individual pieces of high-output construction equipment may be tailored for, and crucial in completing specific tasks. However, these individual pieces of high-output construction equipment may otherwise go unused when not engaged in the specific task, resulting in multiple idle assets and potential associated opportunity cost, while the unused equipment also occupies storage space in and around the work site, posing a potential safety hazard.

In addition to the issues described above with respect to the indoor use of gas powered equipment, material movers may also encounter mobility challenges while traversing indoor spaces. For example, the sizing and/or agility associated with material movers may inhibit passage through doorways, hallways, aisles, elevators and the like. Work-arounds to the mobility challenges which may be encountered by these types of material movers may include, for example, the use of ancillary equipment such as, for example, cranes, hoists and the like, modifications to walls, manual movement of materials and the like. However, these work-arounds may be costly, time consuming, and not always feasible.

A total task vehicle (TTV), in accordance with implementations described herein, may be a substantially zero emission, electric vehicle which may operate indoors to move a variety of different types of materials and/or to accomplish a variety of different types of tasks, using, for example, different types of tools powered by the TTV and/or accessories connected, for example, both mechanically and electrically, to the TTV. In some implementations, the TTV may be powered by one or more high power density (HD) battery packs. Exemplary HD battery packs are disclosed in U.S. Provisional Application No. 62/404,999 filed Oct. 6, 2016 (PCT/US2017/055619 filed Oct. 6, 2017), which is incorporated by reference. As discussed in greater detail in the aforementioned patent application, the HD battery packs are capable of delivering varying voltage outputs of both AC and DC power. These voltage outputs may be configured to provide relatively high levels of DC power for propulsion of the TTV and various types of convertible powered equipment which may be attached to various powered attachment points on the TTV, while also being configured to provide AC power to function as a generator for tools attached or tethered to the TTV. A high torque/high speed convertible drive system, driven by a brushless DC motor powered by the one or more HD battery packs, may power the material moving capabilities of the TTV. The one or more HD battery packs may also provide relatively long runtime electric generator functionality for high-output construction equipment, and may provide for the mechanical and electrical connection of various powered equipment and accessories for moving materials and/or functioning as a powered tool for accomplishing various tasks. In some implementations, the TTV may employ a three-wheel, off-road, cantilevered suspension system, allowing the TTV to adapt to differences in jobsite terrain as well as maneuver through standard sized doorways, aisles, hallways, tight turns and the like. In some implementations, the TTV may operate in multiple modes, including, for example a ride-on mode, a walk-behind mode, and other modes that may provide for additional flexibility and adaptability in use of the TTV.

A TTV, in accordance with implementations described herein, may deliver a relatively large amount of power, for example, sufficient to supply power to an on-site team for a full work day, using powered equipment and accessories coupled to the powered attachment points on the TTV and/or tethered tools, as well as numerous other task related capabilities of the TTV. This supply of power and capability, directly to a work site, may allow the team to accomplish tasks on site without the use of gas powered equipment, extension cords, lifting/hoisting equipment, excessive manual labor and the like. The TTV may arrive at the work site under its own conveyance, without the assistance of additional moving/hoisting/towing equipment and may adapt to various different types of terrain encountered at the work site. In some implementations, the TTV may be easily mounted to a tow hitch towed for transport over relatively longer (for example, highway) distances, and may employ regenerative battery charging during transport in this manner.

Figure 1B:
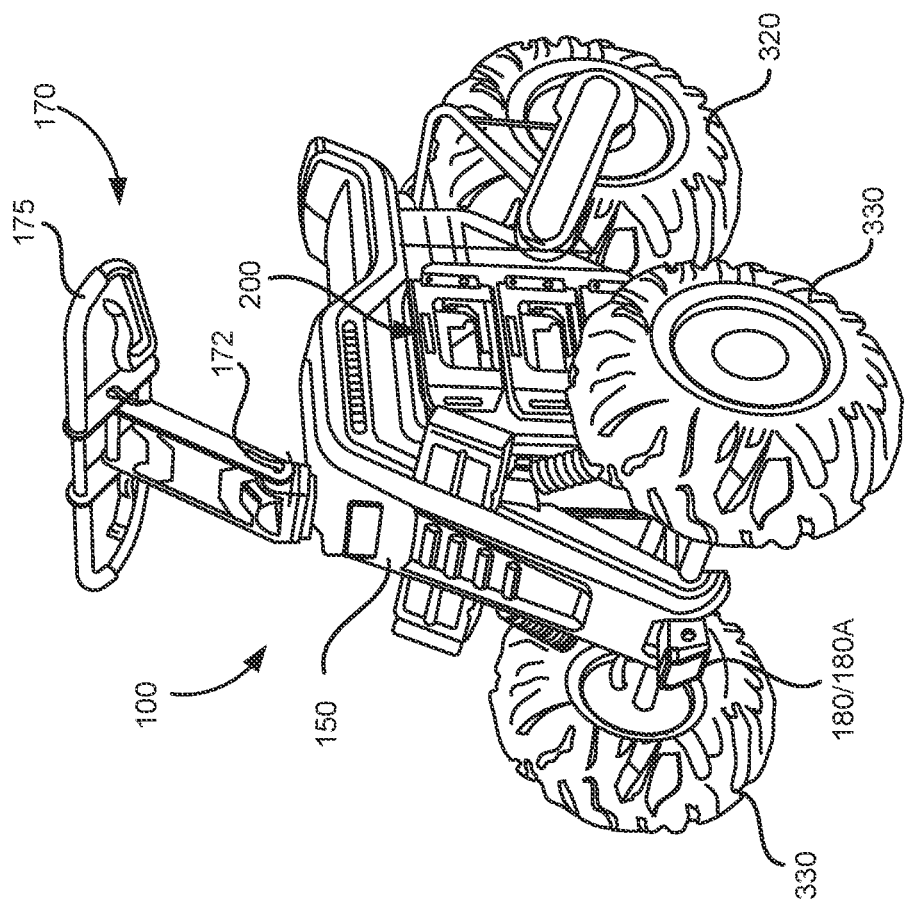
FIG. 1B is a front perspective view of the TTV, in accordance with implementations described herein.
Figure 1E:
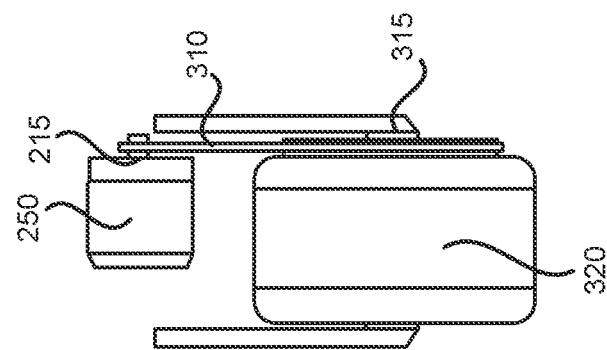
Figure 1D:
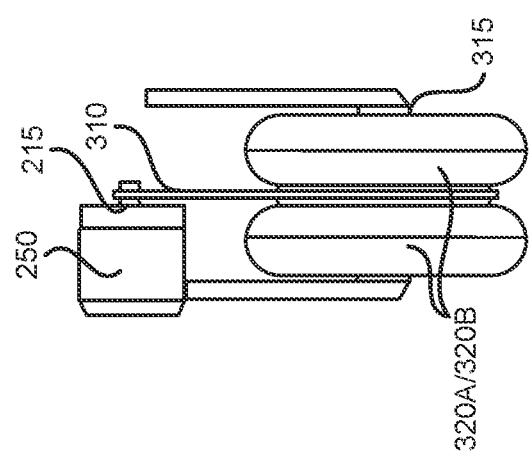

An example of a TTV, in accordance with implementations described herein, is shown in FIGS. 1A and 1B. The TTV 100 may be defined in part by a frame 150. One or more HD battery packs 200 may be carried on the frame 150 of the TTV 100 to provide power to the TTV 100, as well as to various other tools and/or accessories connected to the TTV 100. In the example shown in FIGS. 1A and 1B, the TTV 100 is carrying three HD battery packs 200. However, the TTV 100 may run on, and maintain its functionality with fewer than three HD battery packs 200, such as, for example, one HD battery pack 200, or two HD battery packs 200. A motor 250 may be carried on the frame 150. The motor 250 may receive power, for example, 240V DC to 380V DC power, from the one or more HD battery packs 200, with power generated by the motor 250 driving a rear wheel assembly 320 of the TTV 100 via a power transmission device 310 such as, for example, a chain. As shown in FIGS. 1C and 1E, the power transmission device 310 may be coupled to the motor 250, for example, to an output shaft 215 of the motor 250, to transmit a rotating force from the motor 250 to a rear axle 315, to in turn rotate the rear wheel assembly 320 of the TTV 100. In some implementations, the power transmission device 310 may be coupled to an outer end portion of the rear axle 315 of the TTV 100. As shown in FIG. 1D, in some implementations, the rear wheel assembly 320 may include a first rear wheel 320A and a second rear wheel 320B, with the power transmission device 310 coupled to an intermediate portion of the rear axle 315 of the TTV 100 positioned between the first rear wheel 320A and the second rear wheel 320B. In some implementations, the rear wheel assembly 320, as well as each of the front wheel assemblies, may be equipped with off-road tires, allowing the TTV 100 to traverse various different types of terrain that may be encountered in various different types of work sites.

An operator control system 170 may be coupled to a drive and suspension system of the TTV 100, allowing an operator to control movement of the TTV 100 (i.e., speed, movement direction and the like). The operator control system 170 may also allow the operator to control the power supplied to the various tools and accessories which may be connected to the TTV 100, and operation of the accessories coupled to the TTV 100.

Operation and configuration of an exemplary HD battery pack, such as the HD battery packs described above with respect to FIGS. 1A and 1B, will be now described in more detail with respect to FIGS. 2A-2B and 3A-3F.

Figure 2A:
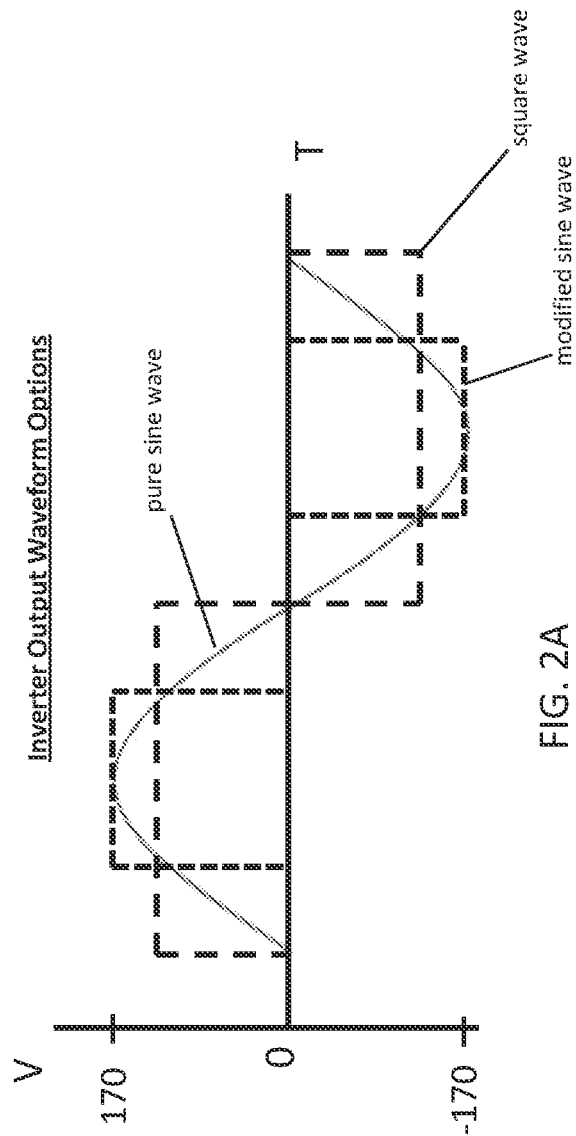
FIG. 2A is a graph of exemplary waveforms and FIG. 2B is a circuit diagram of an exemplary boost converter.
Figure 2B:
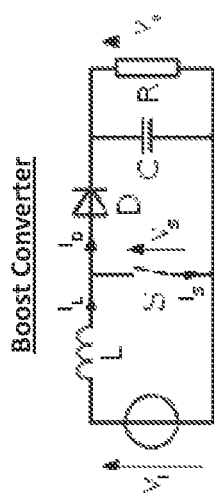
Figures 3A, 3B:
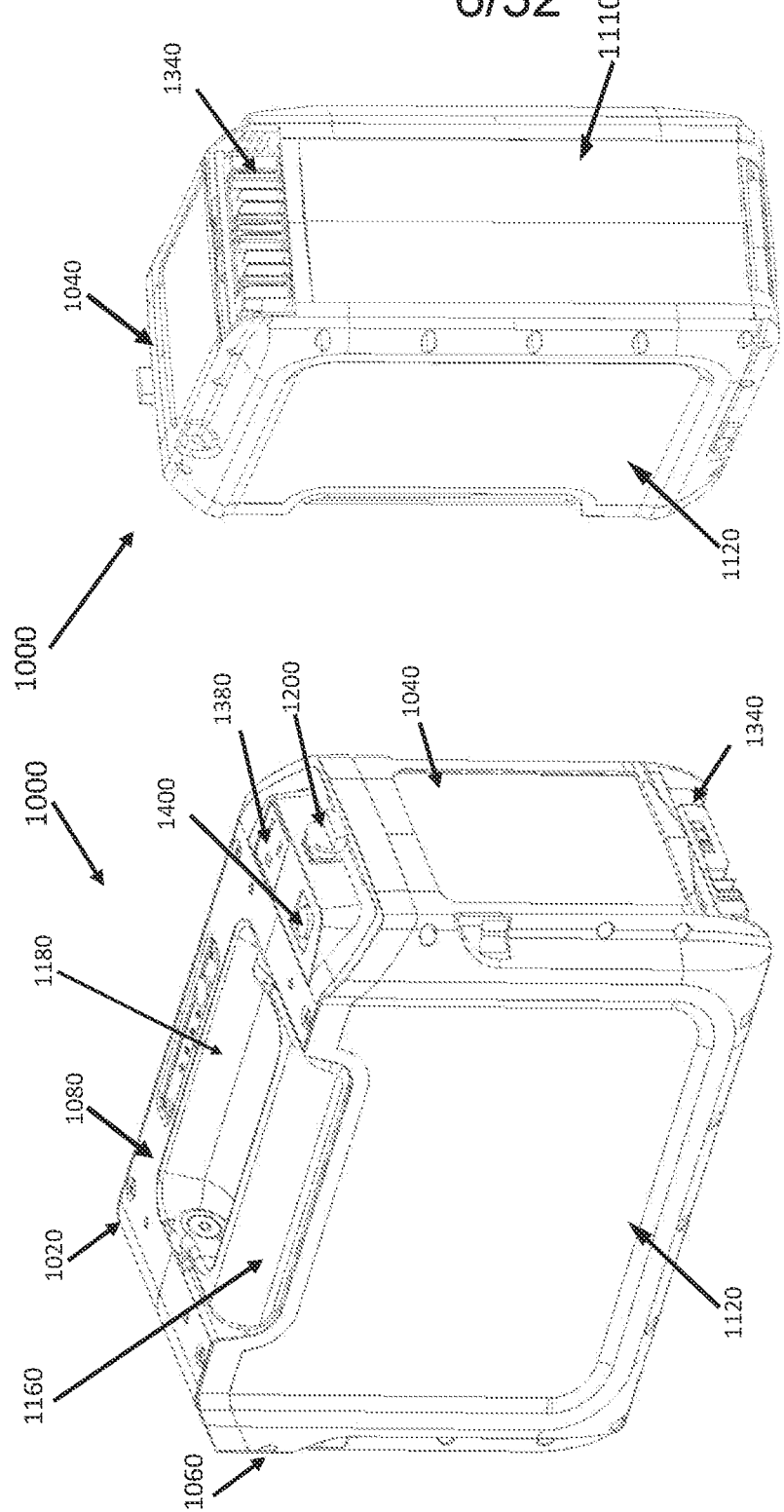
FIG. 3A is a front perspective view.
FIG. 3B is a bottom perspective view.

FIG. 2A is a graph of exemplary waveforms and FIG. 2B is a circuit diagram of an exemplary boost converter. As noted above, access to AC power to operate AC powered equipment, without being tied to a fixed utility power supply, may rely on a gas powered generator, or a relatively large and costly battery powered inverter, thus prohibiting use in many environments. Referring to FIG. 2A, common AC voltage in the U.S. and elsewhere is approximately 120 volts AC. This value is a root-mean squared (RMS) value that will provide an equal value to that of a direct current (DC) power source powering a resistive load. The peaks of the 120V AC sine wave are 170V. Common methods for producing a waveform to run an AC product may include, for example, a pure sine wave, a square wave, and a modified sine wave.

An inverter that produces a pure sine wave will attempt to replicate the AC waveform produced by a utility power supply. However, this may require relatively costly and large electronic components (i.e. inductors, transformers and the like) to provide a clean, consistent waveform. An inverter that produces a square wave may match the RMS of the 120V AC utility power supply at a comparably lower cost and/or size, but the shape of the waveform may cause issues with some AC powered equipment, such as, for example, equipment with particularly sensitive electronics, electronic drives, audio, and induction motors. An inverter that produces a modified sine wave may also match the RMS of the 120V AC utility power supply, but may encounter issues operating equipment having variable speed control and electronics that require a zero-cross at line frequency (i.e. 60 Hz).

Battery based inverters may rely on low voltage batteries or a bank of battery cells or packs, such as a 12V DC battery pack or a plurality of cells strung together, to produce 12V DC as compared to the 120V AC of a utility power supply. With reference to FIG. 2B, a DC to DC converter (also known as a boost converter) between the battery and the inverter circuit may be employed to increase the battery voltage level and achieve the higher AC voltage waveform. However, these converter electronics are large, costly, and add heat to the system. Thermal management of the boost converter and/or the inverter circuitry typically requires a significant increase in the physical size of the inverter. A boost converter in conjunction with a low voltage battery and an inverter, or a high voltage battery bank and an inverter, may produce the high voltage AC signal required to operate this type of AC powered equipment.

Whether using a low voltage DC battery and a boost converter, or a high voltage battery bank, inverters may utilize the full DC voltage of all of the available battery cells to provide the positive half of the AC cycle, and then electrically invert the same full DC voltage of all of the available battery cells to provide the negative half of the AC cycle.

User contact with high voltage (approximately 60 volts or greater) can cause serious injury. Accordingly, high voltage battery packs may be designed such that high voltage points, including the output terminals, are inaccessible. However, equipment that is capable of receiving two or more of these types of high voltage battery packs (connected in parallel) includes an equal number of battery pack receptacles and associated terminal blocks. In this scenario, the high voltage of the high voltage battery pack may be accessible through an empty battery pack receptacle if the terminals of the terminal block of the piece of equipment are exposed. Preventing access to this high voltage, such as, for example, transistors, relays, opto-isolators and the like, can be large and costly, and thus impractical for implementation in a high power battery pack and equipment system.

If a battery pack or portable power supply were to include two discrete subsets of battery cells, it would be advantageous to be able to charge the discrete subsets of battery cells individually or simultaneously using a single battery pack charger. If power is drawn from each subset of battery cells unevenly, or if impedance differences between the subsets of battery cells cause power to be drawn unevenly when power is being drawn from both subsets of battery cells, or if current drains from the electronics related to one subset of battery cells is greater than the other subset of battery cells, a voltage imbalance may develop between the two subsets of battery cells. It is desirable to correct this voltage imbalance during charging. It is also desirable to keep the charging DC voltage as low as possible to reduce the size and cost of the charger.

An exemplary battery pack 1000, such as, for example, the HD battery pack 200 described above with respect to FIGS. 1A and 1B, in accordance with implementations described herein, is shown in the various views illustrated in FIGS. 3A-3F. The battery pack 1000 may also be referred to as a portable power supply. The battery pack 1000 may include a generally rectangular box housing 1020. The housing 1020 may include a front side 1040, a rear side 1060, top side 1080, a bottom side 1100, a left side 1120 and a right side 1140. In some implementations, the housing 102 may also include a handle 1160, for example, on the top side 1080.

In FIGS. 3A-3F, the handle 1160 is at rest in a cutout 1180 in the top side 108 of the housing 1020, and may be secured in the cutout 1180 by a locking element 1200 extending from the front side 1040 of the housing 1020. As the handle 1160 rotates up and out of the cutout 1180 to an upright position, the locking element may also rotate. An exemplary piece of equipment to which one or more battery packs 1000 may be coupled, may include a receiving J-slot. Prior to coupling the battery pack 1000 to the equipment, the handle 1160 may be rotated to the up position, and a semi-cylindrical portion of the locking element 1200 may be rotated to a vertical position. As the battery pack 1000 mates with the equipment, the semi-cylindrical portion of the locking element 1200 may be received in a vertical portion of the J-slot. Once the battery pack 1000 is fully seated in the equipment, the handle 1160 may be rotated back into the cutout 1180, and the semi-cylindrical portion of the locking element 1200 also rotates to the locking position within the J-slot. Once in the locking position, the semi-cylindrical portion of the locking element 1200 is in a horizontal position and abuts against a horizontal portion of the J-slot to lock the battery pack 1000 into a battery pack receiving chamber of the equipment.

In some implementations, the housing 1020 may also include a state of charge (SOC) indicator 1300 on the top side 1080, and a switch 1320 for activating the SOC indicator 1300. The SOC indicator 1300 may display the state of charge of a plurality of battery cells within the battery pack when the switch 1320 is activated.

In some implementations, the housing 1020 may include a DC port 1340, which may also be referred to as a tool receptacle, a battery pack port, or an interface. The DC port 1340 may provide an interface for coupling the battery pack 1000 to DC powered devices such as tools. The DC port 1340 may include a plurality of electrical terminals 1360, or, for example, a set of electrical terminals 1360, including, for example a subset of power terminals and a subset of signal terminals. The power terminals may transfer current and voltage at levels appropriate to power a coupled piece of equipment, or receive current and voltage from a battery pack charger at a level appropriate to charge the battery cells. The signal terminals may transfer current and voltage at a level adequate to provide information or data from the battery pack 1000 regarding the state of the battery pack 1000 and/or battery cells, and/or to receive information or data from regarding the state of the a piece of coupled equipment. In some implementations, the current and voltage levels transferred on the power terminals are greater than the current and voltage levels transferred on the signal terminals.

The plurality of battery pack terminals 1360 may include only male terminals, or only female terminals, or a combination of male and female terminals with a corresponding configuration in the connected piece of equipment. Furthermore, the plurality of battery pack terminals 1360 may be configured such that are they all recessed in the housing 1020, all extend from the housing 1020, or some are recessed in the housing 1020 and some extend from the housing 1020. The housing 1020 may also include an AC port 1380, or a plug receptacle, an interface to provide an interface for coupling the battery pack 1000 to AC powered devices. The AC port 1380 may be a standard three-prong receptacle, or may take other configurations.

The housing 1020 may also include a switch or button 1400 for activating an inverter for providing an AC power output waveform at the AC port 1380. The switch 1400 may be coupled to the internal inverter, or to a simpler circuit for providing the AC power output waveform from the set of battery cells.

Figure 4A:
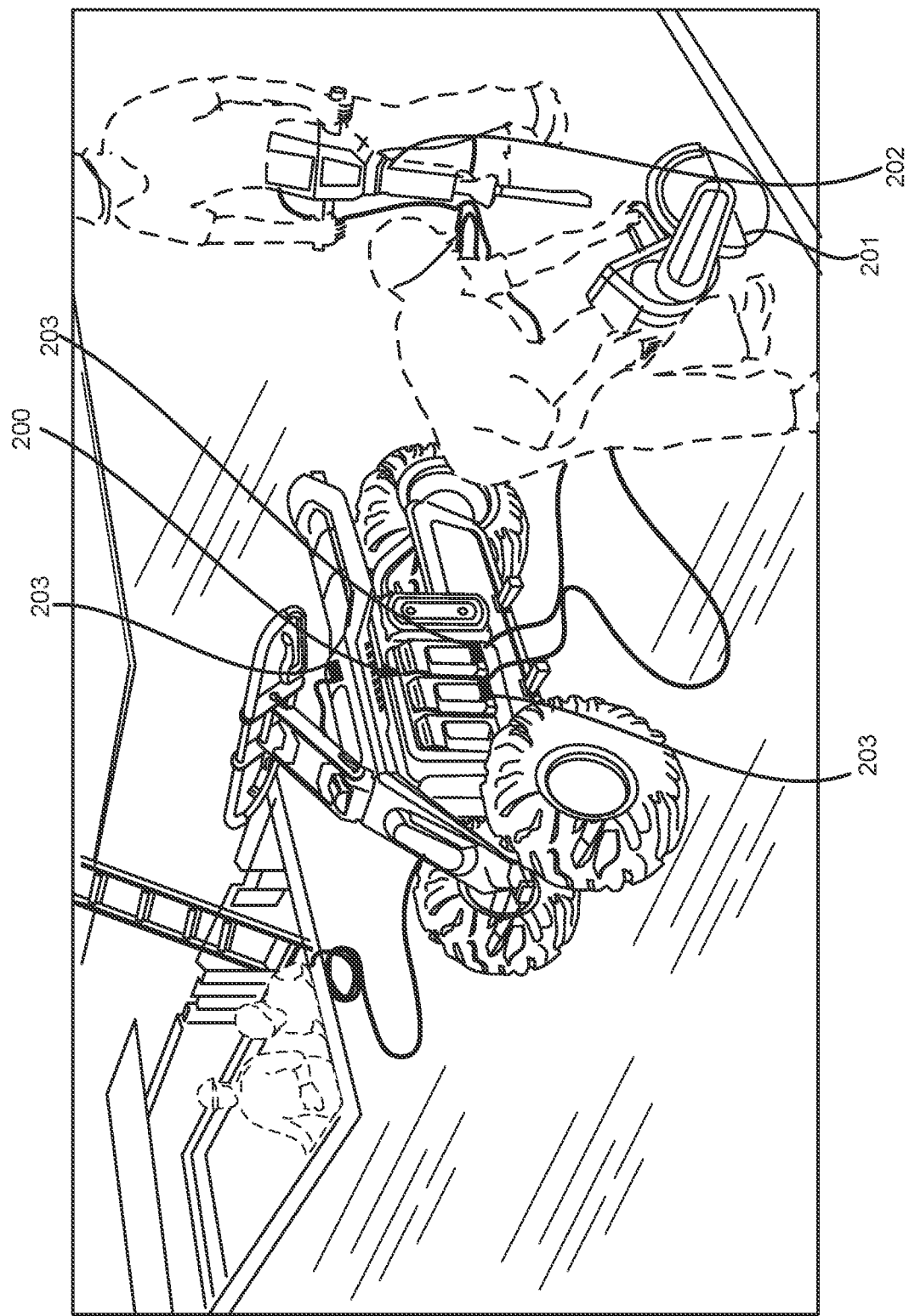
FIG. 4A illustrates connections of exemplary tools to a TTV at an exemplary work site, in accordance with implementations described herein.

FIG. 4A illustrates the TTV at an example work site. In the example shown in FIG. 4A, a first tool 201 is powered by one of the battery packs 200 on the TTV 100 via a power port 203 on one of the battery packs 200, and a second tool 202 is powered by one of the battery packs 200 via another power port 203 on one of the battery packs 200. In this example, the battery packs 200 on the TTV 100 may essentially function as a 120V AC electric power generator, providing power to the tethered tools via the power ports 203, so that the first and second tools 201, 202 electrically connected to the battery packs 200 via, for example, cords or tethers may receive 120V AC power to operate at the work site without the use of gasoline (to, for example, run a generator and/or power the individual tools) and/or other problems associated with the lack of readily available on-site electrical power.

Figure 5A:
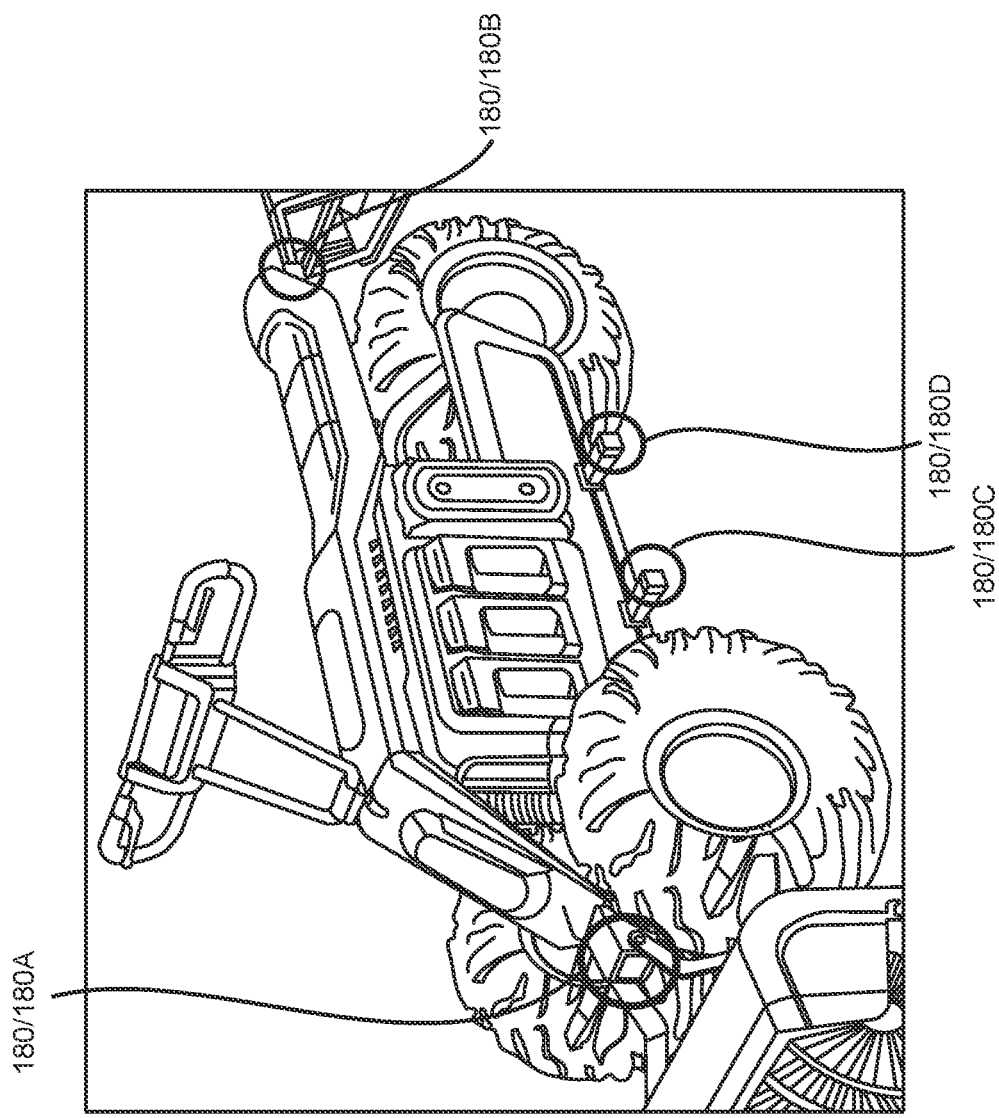
FIGS. 5A-5C illustrate attachment of exemplary accessories to a TTV, in accordance with implementations described herein.
Figure 5B:
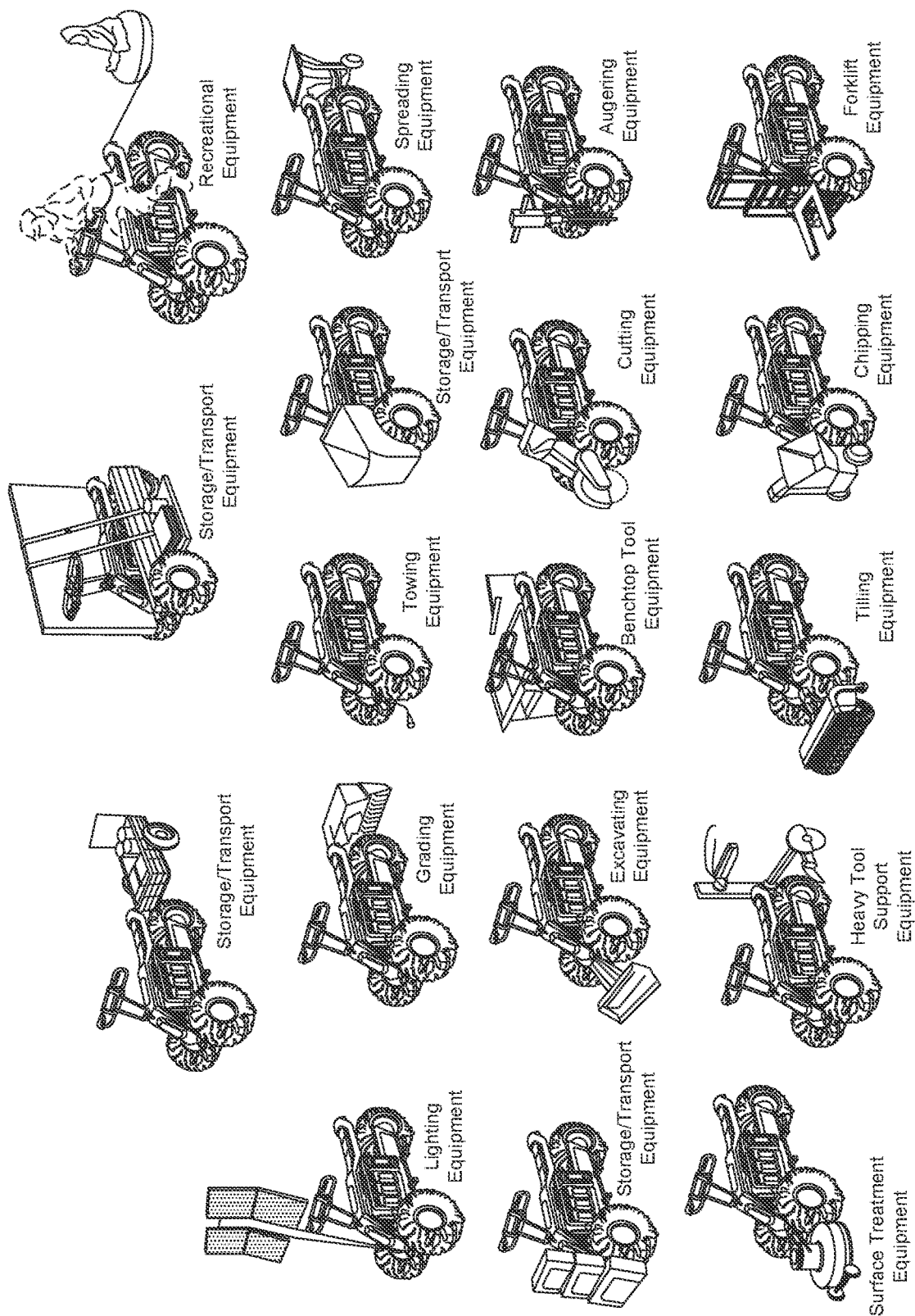
Figure 5C:
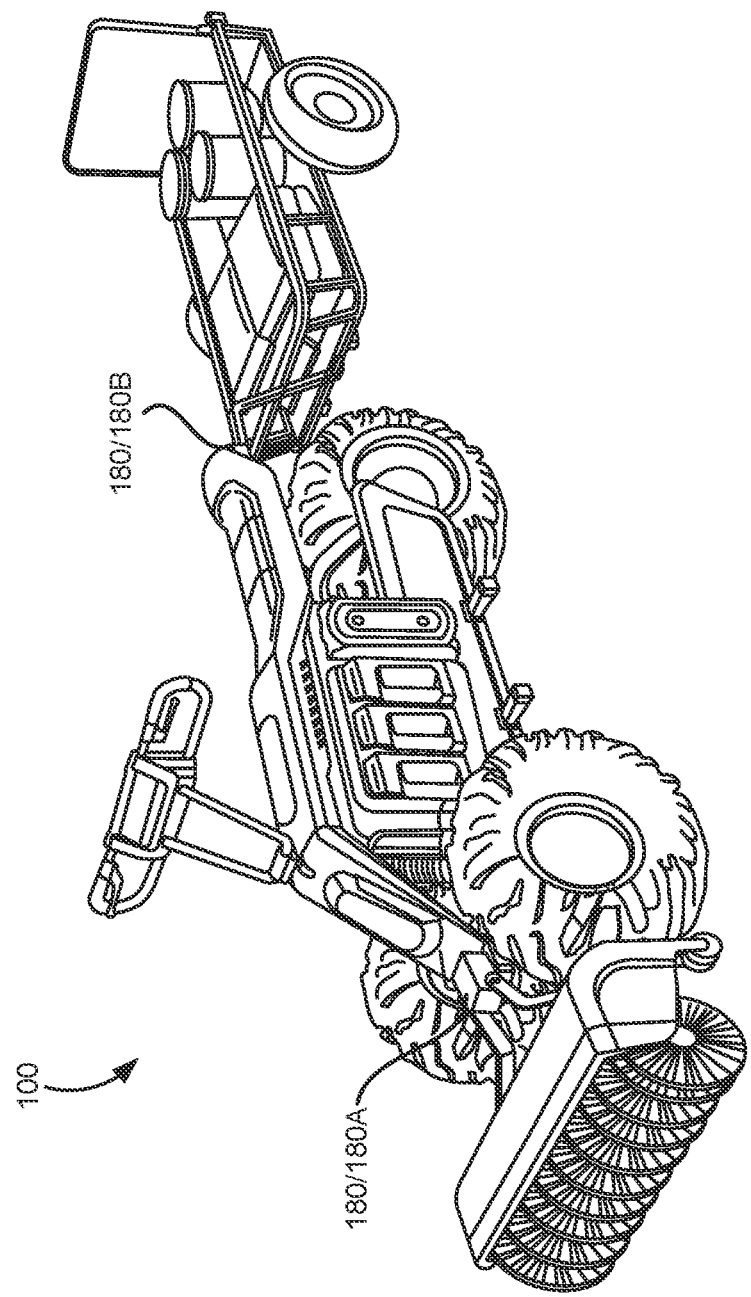

As shown in FIG. 5A, the TTV 100 may include a plurality of accessory attachment ports 180, provided, for example, on the frame 150 of the TTV 100. The attachment ports 180 (180A, 180B, 180C, 180D) shown in FIG. 5A are just some examples of where attachment ports 180 may be positioned on the TTV 100, and more, or fewer, attachment ports 180 may be provided on the TTV 100, and/or in a different arrangement than shown in FIG. 5A. The attachment ports 180 may provide for both mechanical connection and electrical connection of various accessories to the TTV 100, so that the accessories may be carried by the TTV 100, and may also receive power, for example, 240V DC to 380V DC power, from the one or more battery packs 200 on the TTV 100, to operate the various accessories. Some examples of accessories which may be coupled to one or more of the attachment ports 180 on the TTV 100 are shown in FIG. 5B. In the example shown in FIG. 5C, a rotating brush accessory is coupled to a first attachment port 180A, and a pull cart, or trailer accessory is coupled to a second attachment port 180B on the TTV 100. Many of the accessories shown in FIG. 5B may be attached to, for example, the first attachment port 180A or the second attachment port 180B, depending on various different factors, such as, for example, a usage environment, tasks to be accomplished, user preferences, operation mode of the TTV 100 (to be discussed in more detail with respect to FIGS. 7A-7E) and the like.

The battery packs 200 may provide power, for example, 240V DC to 380V DC power, to the motor 250, to in turn propel the TTV 100. Each of the battery packs 200 may also include one or more ports, and/or may be in communication with one or more ports on the TTV 100, allowing for connection of various different types of tools, such as, for example the tools 201, 202 shown in FIG. 4A, via, for example, cords and/or tethers, to supply power, for example, 120V AC power, to the tools connected in this manner. The battery packs 200 may also provide power to the various attachment ports 180 on the TTV 100, allowing for operation and control of the various accessories that may be attached to the TTV 100 at the attachment ports 180, as well as providing power in support of various functions associated with the operation of the accessories. Thus, as noted above, the TTV 100 may run on one battery pack 200, or two battery packs 200, while simultaneously drawing power from one of these battery packs 200, or a third battery pack 200, to power a separate tool and/or accessory.

Figure 4B:
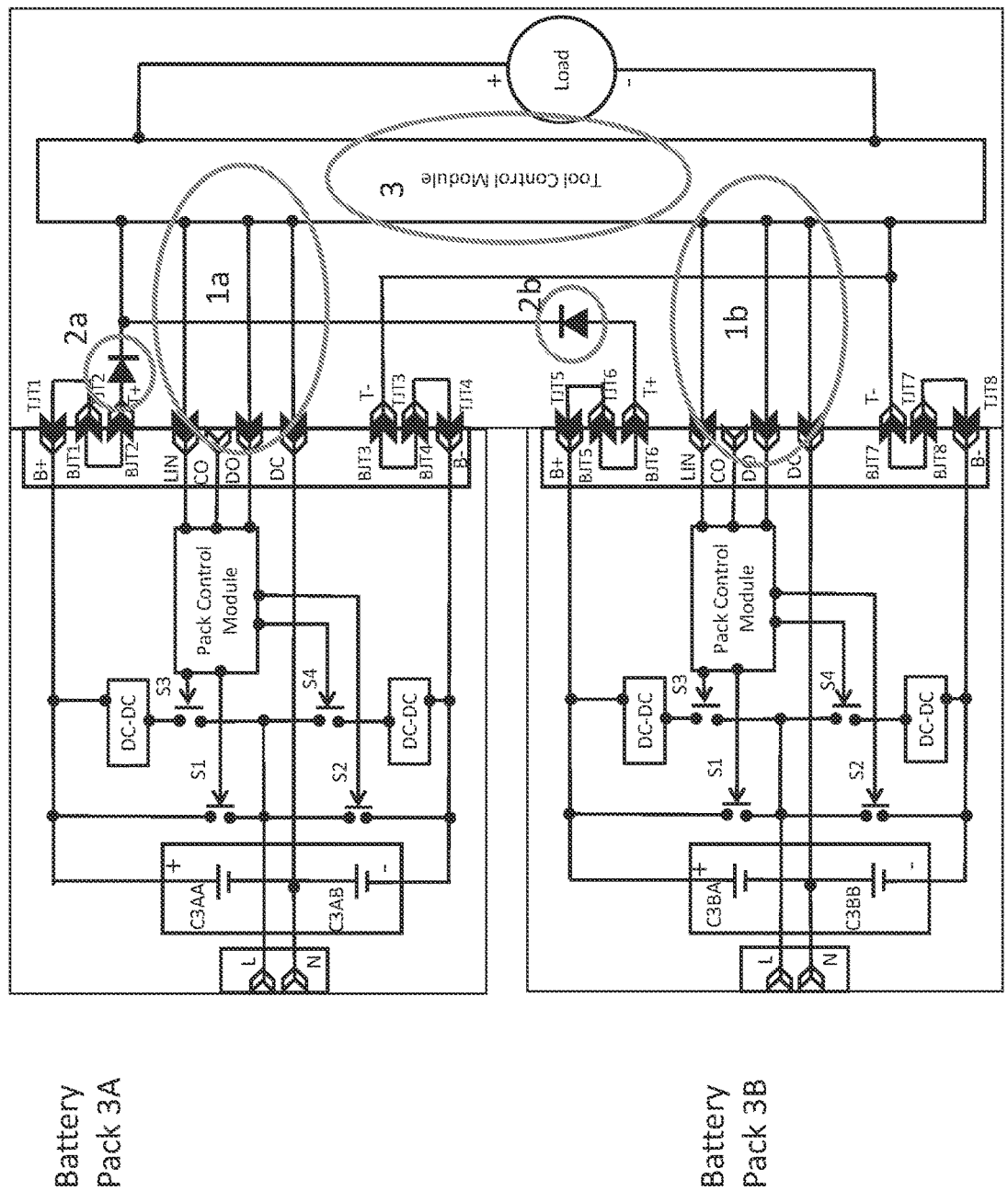
FIG. 4B is an exemplary circuit diagram of a plurality of battery packs powering a TTV, in accordance with implementations described herein.

In providing power to the motor 250, in some implementations, power may be drawn primarily from one of the battery packs 200, in particular, the battery pack 200 having the highest available voltage. The circuit diagram shown in FIG. 4B illustrates connection of multiple exemplary battery packs 5A and 5B, for example, the battery packs 200 for connection to the TTV 100. In the example shown in FIG. 4B, diodes 2a and 2b may allow the battery packs 5A and 5B to be paralleled without causing one battery pack to recharge from the other battery pack. The connection points of the diodes 2a and 2b may define a B+ bus, and the connection points of the negative battery pack terminals may define a B− bus. In this arrangement, the diodes 2a and 2b may prevent current from flowing from a higher voltage battery pack, through the bus, and to a lower voltage battery pack. Under the control of a controller 3, this configuration may cause current to be drawn primarily from the battery pack having the highest available voltage, with signaling connections 1a and 1b allowing the controller 3 to communicate with and control the battery packs 5A and 5B. This communication may allow the controller 3 to assess the condition, for example, available voltage levels, of the battery packs 5A and 5B, and to instruct each battery pack 5A and 5B to selectively deliver power or not to deliver power to the connected load. This may override the effect, noted above, of discharging the highest voltage pack first. In some situations, the signaling connections 1a and 1b could instruct the battery packs 5A and 5B to selectively disable the AC inverter, allowing all available power to be made available for operation of the TTV 100 (and/or to tools connected and/or attached and/or tethered thereto), as opposed to sharing power with the AC inverter As discussed in the aforementioned U.S. Provisional Application No. 62/404,999/PCT Application PCT/US2017/055619, each of the battery packs 200 may include an integrated inverting device, allowing DC power generated by enclosed battery cells to be converted to standard 120V AC power. This may allow the battery packs 200 to provide power to the power ports 203 provided on the battery packs 200, and/or to the power ports on the TTV 100 that are in communication with the battery packs 200, thus allowing standard power to be delivered to tools and equipment attached/tethered to the TTV 100 via the power ports.

Figure 6:
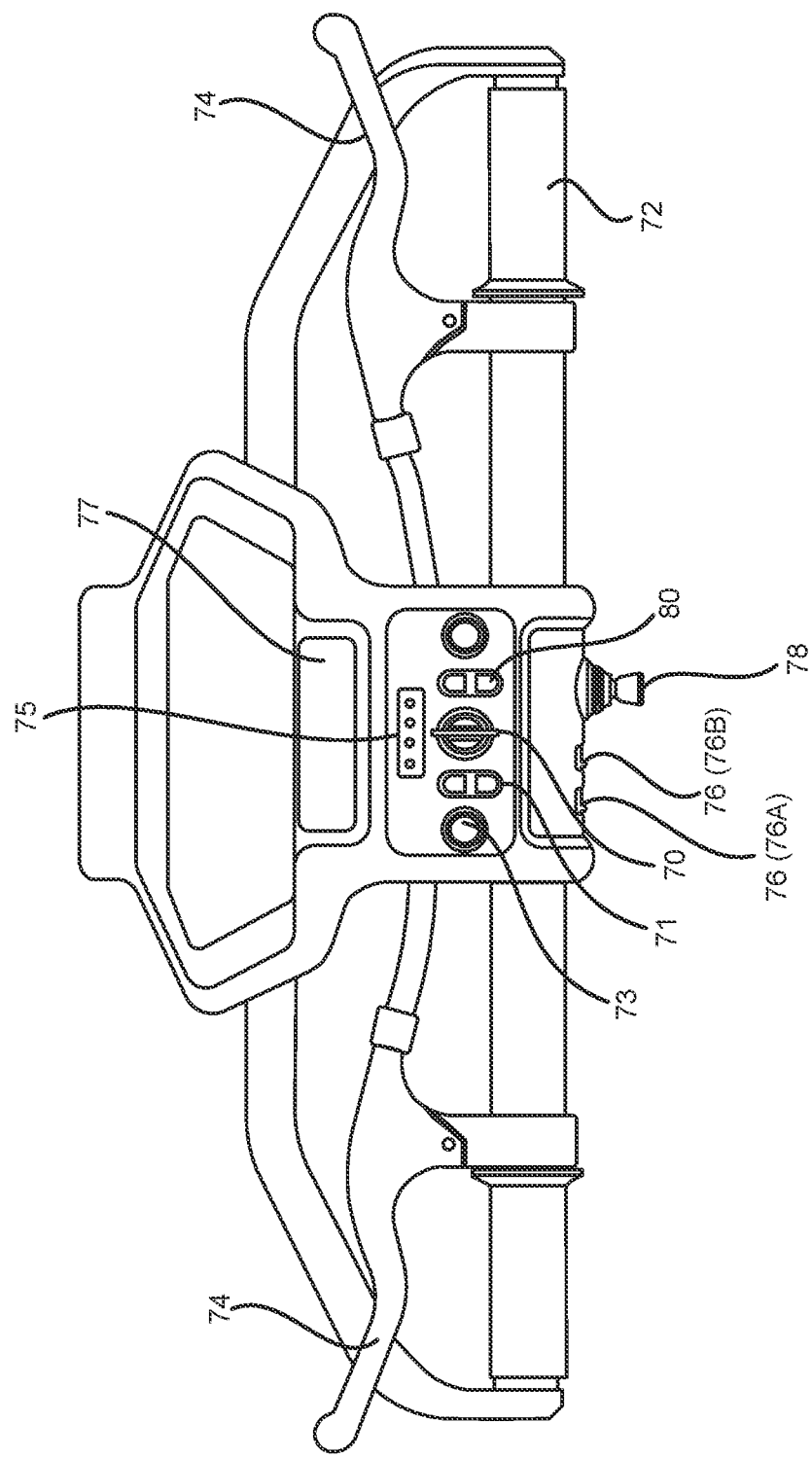
FIG. 6 is a top view of an exemplary operator control panel of a TTV, in accordance with implementations described herein.

In providing power to the attachment ports 180, the battery packs 200 may provide DC power generated by the enclosed battery cells (for example, the battery packs 5A and 5B described above with respect to FIG. 2B), directly to the attachment ports 180 for powering of high power equipment attached at the attachment ports 180. In some implementations, the attachment ports 180 may include a smart connector. Upon receiving a piece of powered equipment for connection to the TTV 100 in one of the ports 180, the smart connector may identify the particular piece of powered equipment received in the port 180, and corresponding power requirements, and may provide AC or DC power to the attachment port 180 for powering the piece of connected powered equipment accordingly. The operator control system 170 may include a control panel 175, as shown in FIG. 6. The control panel 175 may include, for example, manipulation devices which may be manipulated by the operator to control overall operation of the TTV 100. The manipulation devices on the control panel 175 may also be manipulated by the operator to control operation of accessories connected to the TTV 100 at the various attachment ports 180, flow of power from the battery packs 200, and the like. As shown in FIG. 6, the control panel 175 may include manipulation devices such as, for example, a power switch 70 which may be manipulated by the user to turn the TTV 100 on and off, a throttle actuator 72, and one or more brake actuators 74, which the user may manipulate to control speed of the TTV 100.

One or more accessory power switches 76 may be manipulated by the user to provide power to the various attachment ports 180 for operation of accessories attached at the attachment ports 180. For example, in some implementations, individual accessory power switches 76A, 76B may be individually manipulated to provide power to a selected attachment port 180A, 180B, respectively, to operate an accessory attached thereto. After attachment of an accessory to one of the attachment ports 180, and actuation of the corresponding accessory power switch 76 to provide power to the accessory via the attachment port 180, operation, movement and the like of the accessory may be controlled by user manipulation of an attachment control device 78. The attachment control device 78 may include, for example, a joystick allowing for three-axis control of movement of the accessory, levers, toggles and other such manipulation devices providing for operational control of an accessory attached to one of the attachment ports 180.

A mode selection switch 80 may be manipulated by the user to select a mode of operation for the TTV 100, such as, for example, operation in a forward or reverse direction, or operation in a ride-on or walk-behind mode. Other manipulation devices such as, for example, a light control switch 71, a horn 73 and the like may also be included on the operator control panel 175, along with various indicators, displays, illumination panels and the like, such as, for example, a charge indicator 75 and a directional illumination beam 77. More, or fewer, manipulation devices, indicators and the like may be included on the control panel 175, and/or may be arranged in a different manner from what is shown in FIG. 6.

Figure 7A:
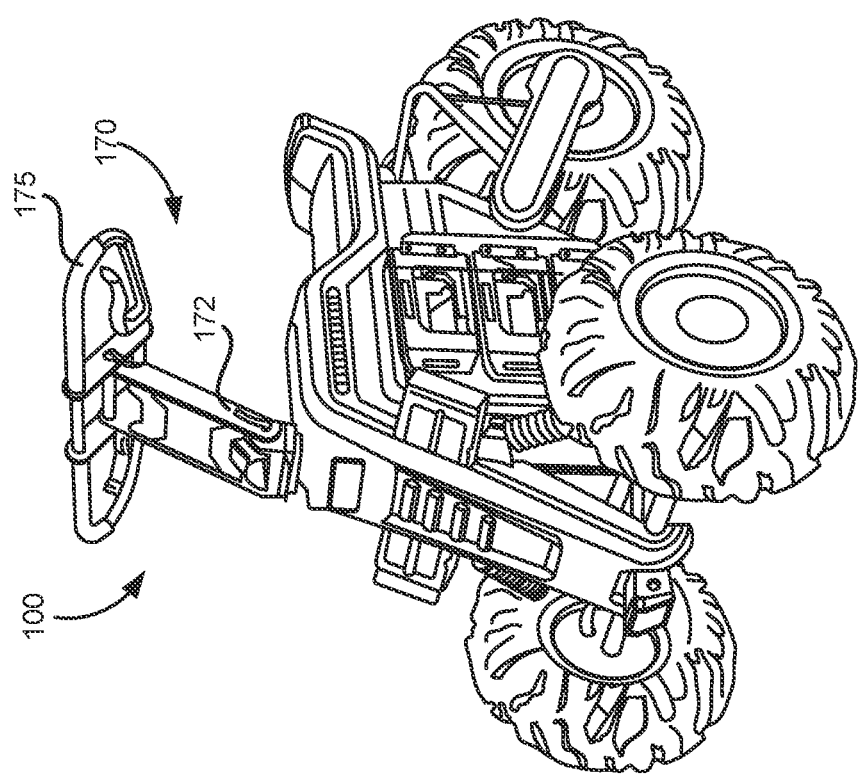
FIGS. 7A-7F illustrate a mode switching operation of a TTV, from a ride-on mode to a walk-behind mode, in accordance with implementations described herein.
Figure 7B:
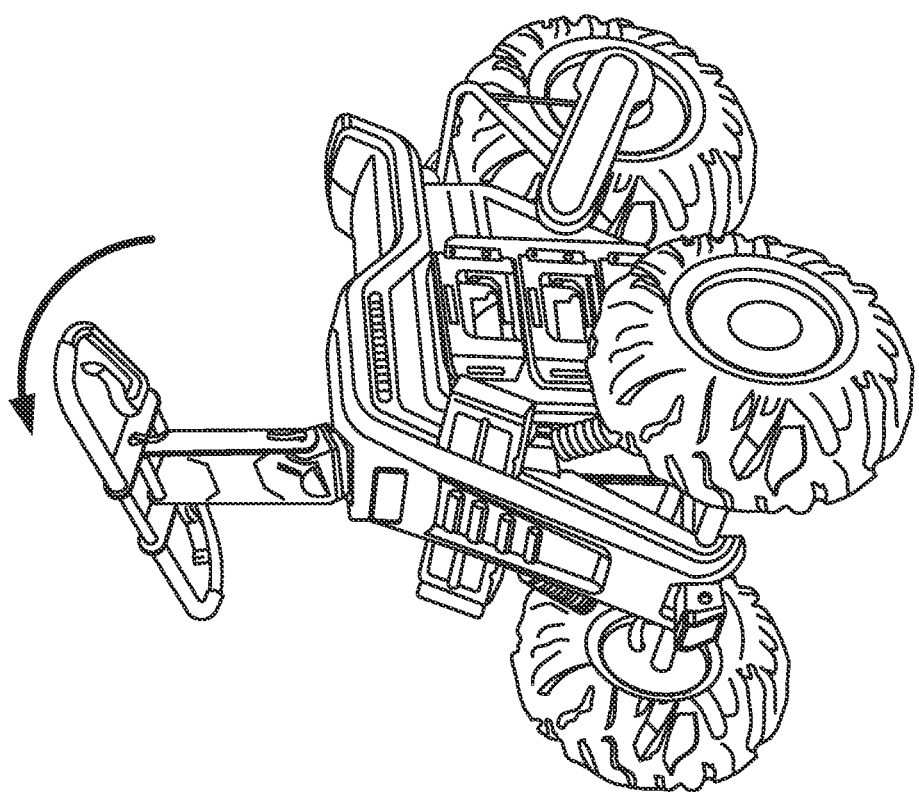
Figure 7C:
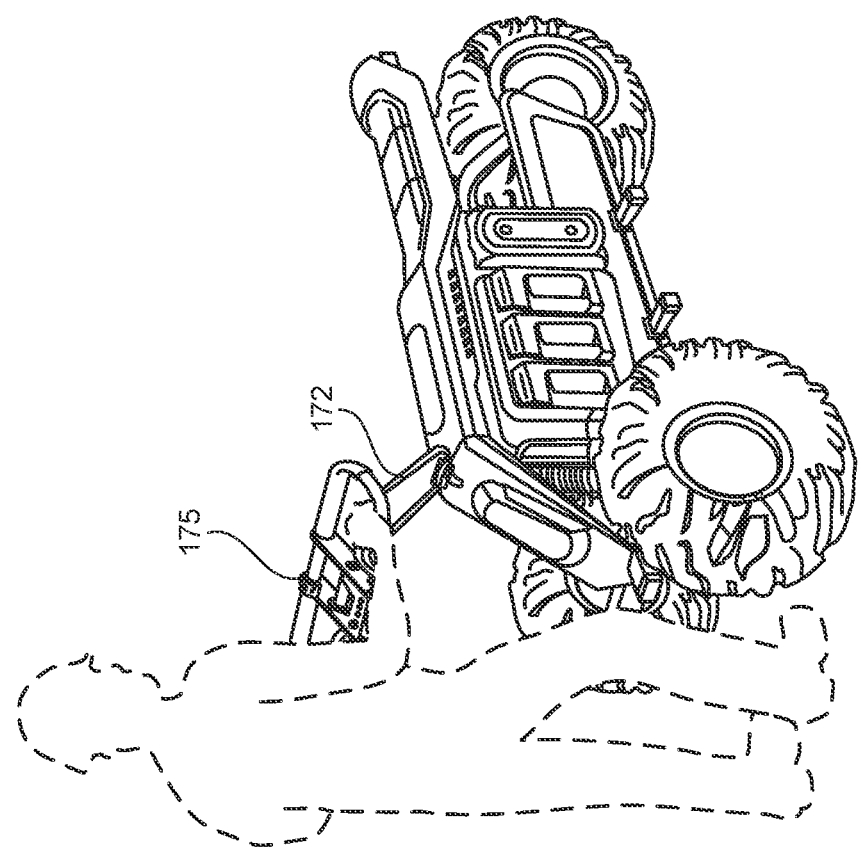

The operator control panel 175 may be coupled to a top end portion of a column 172. The column 172 may be coupled to the drive/suspension system, allowing the control panel 175 to also function as a user operated steering mechanism. The column 172 (and control panel 175 coupled thereto) may be rotatably coupled to a portion of the frame 150, allowing the TTV 100 to transition from a ride-on mode, as shown in FIG. 7A, to a walk-behind mode, as shown in FIG. 7C, by rotating the column 172 and control panel 175 as shown in FIG. 7B. This rotation of the column 172 and control panel 175 may trigger a switch in the operational mode of the TTV 100, between the ride-on mode and the walk-behind mode. For example, the rotation of the column 172 and the control panel 175 may trigger a change in the operating profile of the motor 250.

In some implementations, the motor 250, and the TTV 100, may be operated in a number of different modes, such as, for example, a high speed ride-on mode, a low speed ride-on mode, and a walk-behind mode. For example, in the ride-on mode shown in FIG. 7A, when performing tasks at a work site, the motor 250 may be set to operate the TTV 100 in the low speed ride-on mode, producing a relatively low torque, and at a relatively low top speed, to allow the TTV 100 to be operated safely at the work site both while accomplishing tasks, such as in the examples shown in FIGS. 7E and 7F, and when moving from one section of the work site to another. The motor 250 may also be set to operate the TTV 100 in the high speed ride-on mode, at a relatively low torque and relatively high top speed, when, for example, moving the TTV 100 from one location to another, using the TTV 100 as a recreational vehicle, and the like. In the low speed walk-behind mode shown in FIG. 7C, the motor 250 may operate in a relatively low speed, and relatively high torque mode, to allow the operator to maintain control of the TTV 100, and pilot the TTV 100 safely while walking behind the TTV 100, and in some situations moving a relatively heavy load and/or accomplishing another task. In some implementations, the motor 250 may be a large format, brushless DC motor that receives power, for example 240V DC to 380V DC power, from the one or more battery packs 200 carried by the TTV 100. In some implementations, the motor 250 may generate up to approximately 15 HP to power the TTV 100, depending on the mode of operation of the TTV 100.

Figure 7D:
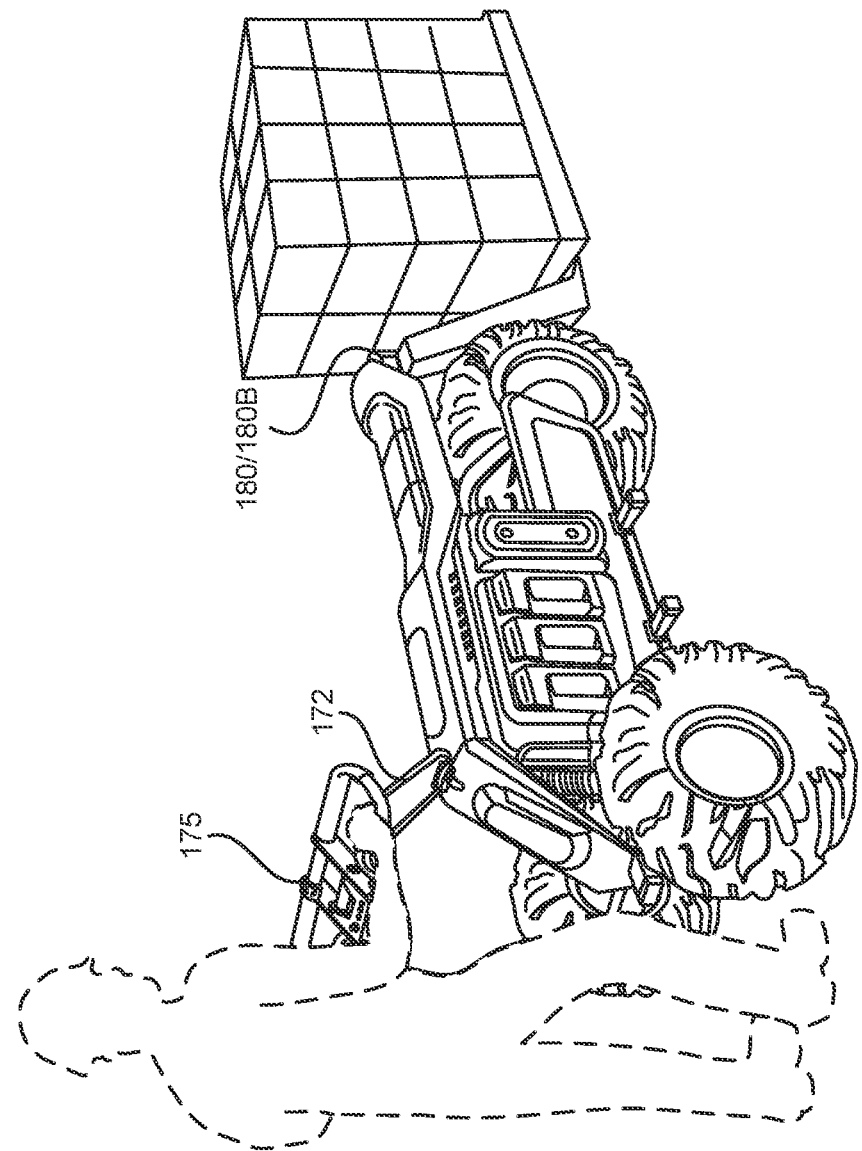
Figure 7E:
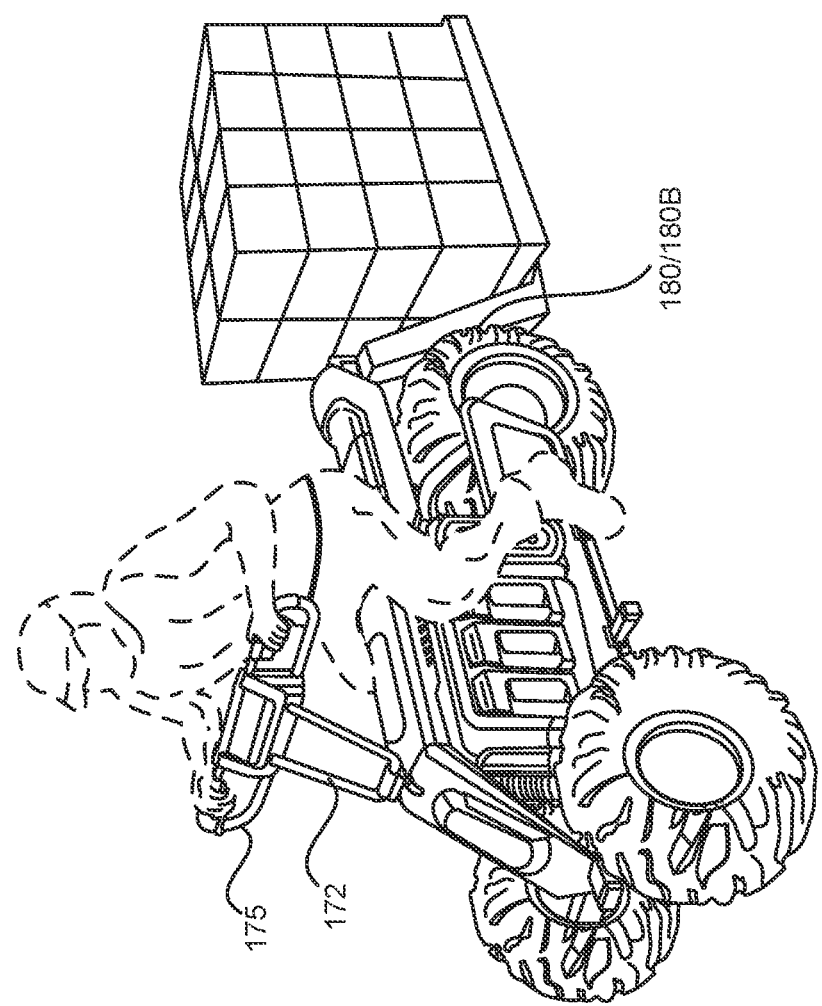
Figure 7F:
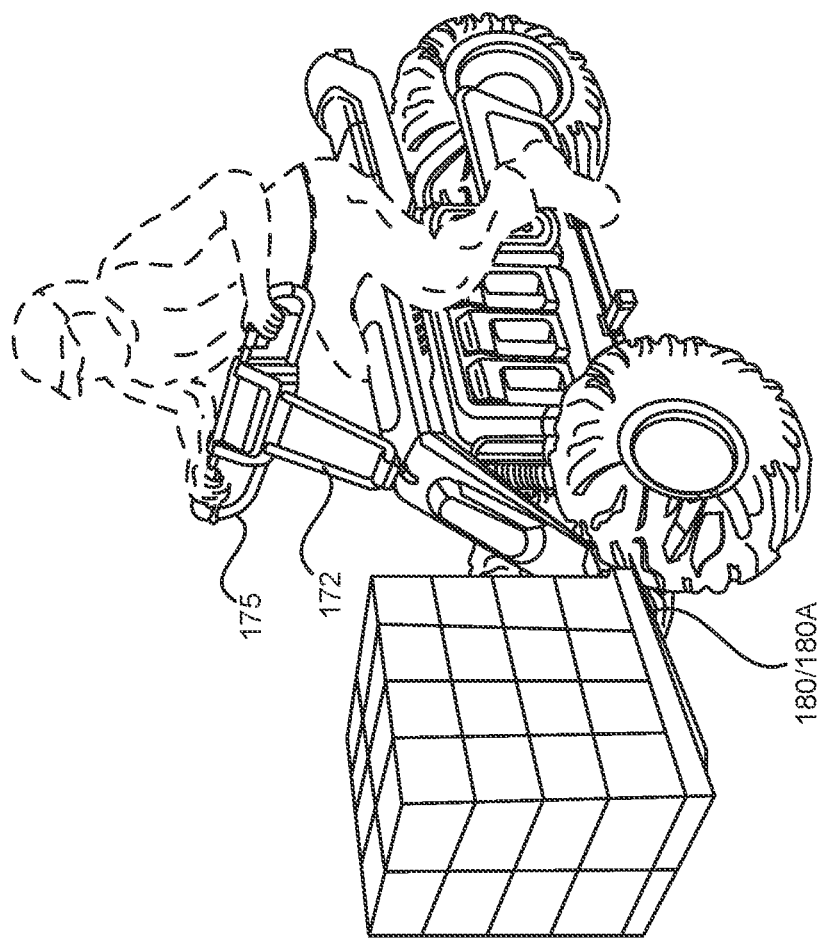

FIG. 7D illustrates a user operating the TTV 100 in the low speed walk-behind mode, with a forklift accessory attached to the second attachment port 180B, carrying a pallet of materials. As noted above, in the walk-behind mode, the motor 250 may operate in a high torque, low speed mode, allowing the operator walking behind the TTV 100 to maintain positive control of the TTV 100 and the load carried by the TTV 100. FIG. 7E illustrates the forklift accessory, attached to the second attachment port 180B, but now with the TTV 100 in the low speed ride-on mode, which may be more convenient when moving the pallet of materials loaded on the forklift over longer distances. FIG. 7F illustrates the forklift accessory, attached to the first attachment port 180A, with the TTV 100 operating in the low speed ride-on mode. This is just an example of the numerous different accessories which may be attached at numerous different attachment ports 180 on the TTV 100, with the TTV 100 safely and easily operated in/switched between the ride-on mode and the walk-behind mode, while controlling the motor in a manner that allows the operator to maintain positive control of the TTV 100, to accomplish a variety of different tasks at a variety of different work sites.

As noted above, some, or all, of the attachment ports 180 (180A, 180B, 180C, 180D shown in the example in FIG. 5A) may provide for both mechanical connection of an accessory to the attachment port 180, and electrical connection of the accessory to the attachment port 180 (for example, one of the accessories shown in FIG. 5B). In some implementations, upon connection, the TTV 100 (for example, a sensor or terminal in communication with the attachment port 180) may detect that a particular one of the accessories has been attached thereto, and may access, for example, an operating profile, operating parameters including, for example, power requirements, speed requirements, 3-axis control requirements/limitations, and the like associated with the detected accessory from previously stored profile information. This may facilitate the connection and use of a variety of different accessories in an essentially plug and play manner, without the need for operational reconfiguration each time a new accessory is attached to the TTV 100.

That is, each accessory may have its own particular capabilities and operating parameters/requirements. For example, a pull cart or trailer attached to the second attachment port 180B (as in the example shown in FIG. 5C) may simply require a mechanical connection to the attachment port 180B when the TTV 100 is operated in the ride-on mode, and the cart or trailer is towed behind the TTV 100. A rotating brush accessory attached to the first attachment port 180A, with the TTV 100 in the ride-on mode (as in the example shown in FIG. 5C), or a forklift accessory attached to the first or second attachment port 180A, 180B, with the TTV in ride-on mode (as in the examples shown in FIGS. 7E and 7F) may require both a mechanical attachment and an electrical attachment to the TTV 100 via the corresponding attachment port 180. This mechanical and electrical connection may allow the battery packs 200 on the TTV 100 to provide power (for example, 240V DC to 380V DC power) to the accessory, via, for example, connection of terminal(s) provided on the accessory and mating terminal(s) provided in the attachment port 180. Connection of the mating terminal(s) of the accessory and the attachment port 180 in this manner may allow for identification of the particular accessory attached, identification of operating profiles/parameters/requirements associated with the attached accessory. This mechanical and electrical connection between the accessory and the attachment port 180 may also allow for operator movement and control of the accessory, via, for example, manipulation of one or more of the manipulation devices on the control panel 175, such as, for example, the attachment control device 78.

Figure 8A:
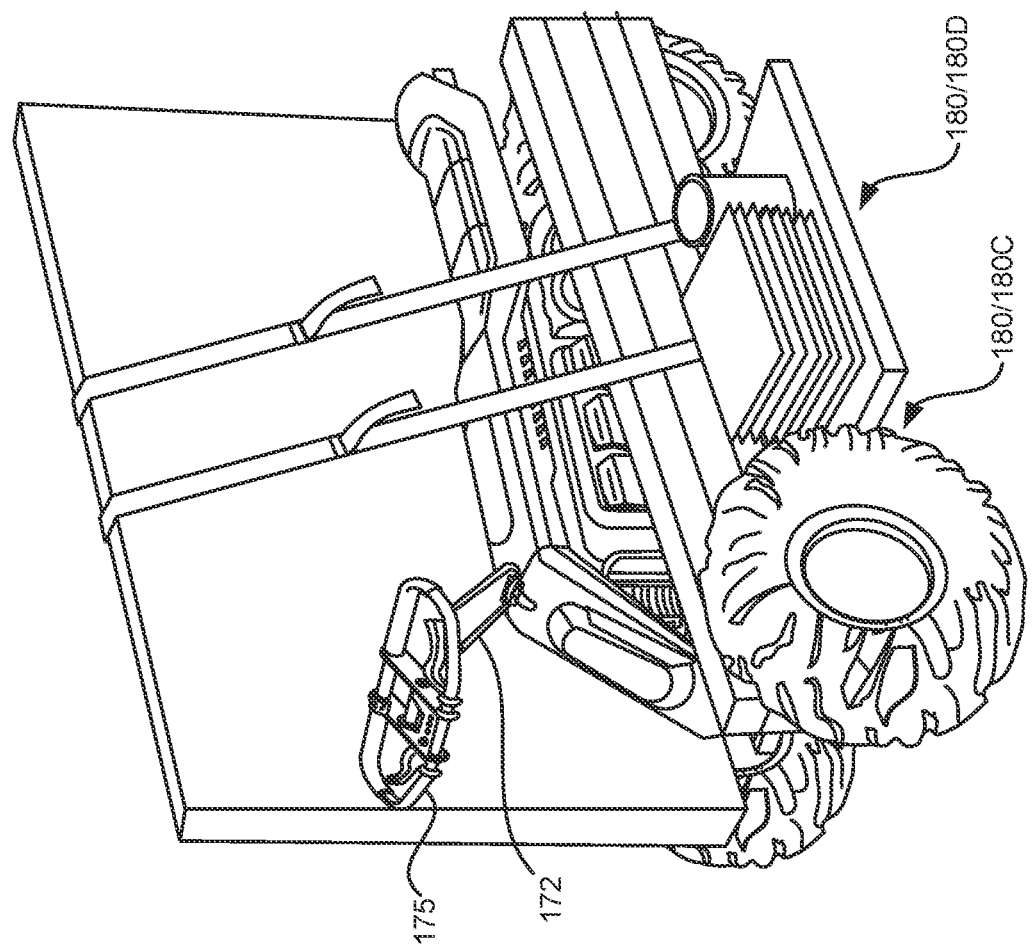
FIGS. 8A-8D illustrate attachment of exemplary accessories to a TTV, in accordance with implementations described herein.

In some implementations, the attachment ports 180 on the lateral sides of the TTV 100, such as, for example, the attachment ports 180C and 180D shown in FIG. 5A, may be used for tasks such as materials and/or cargo loading and movement when the TTV 100 is operated in the walk-behind mode, as in the example shown in FIG. 8A. In the ride-on mode, the attachment of some types of accessories to these attachment ports 180C, 180D at the lateral sides of the TTV 100 may obstruct or interfere with a position of the rider on the TTV 100, and/or operation of the accessory may pose a hazard to the rider, unless the accessory is positioned so that it does not conflict with the rider's safe and stable position on the TTV 100. In some implementations, an accessory may be attached to the attachment ports 180 at the lateral sides of the TTV 100, and extend under the TTV 100, as shown in FIGS. 8B-8D.

Figure 8B:
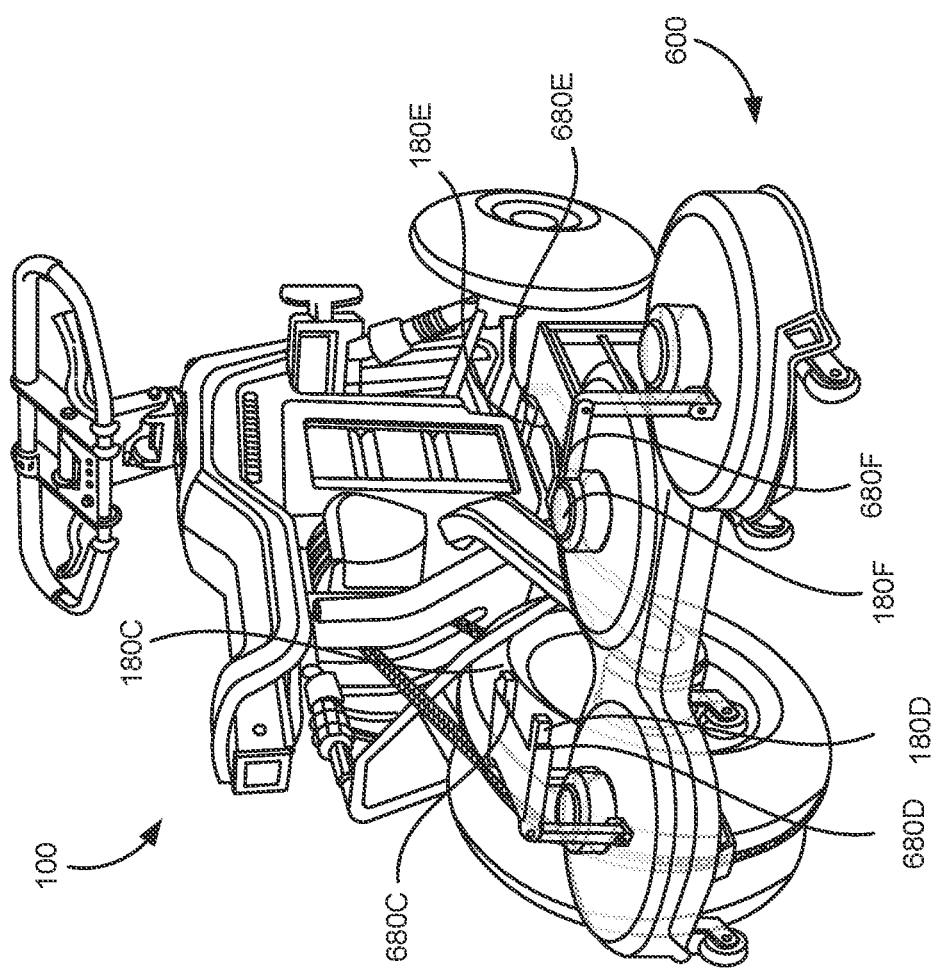
Figure 8C:
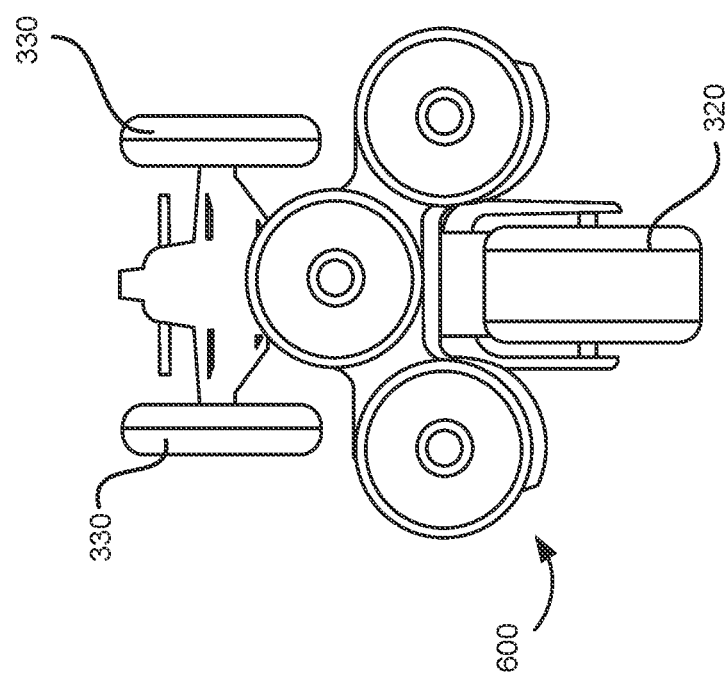
Figure 8D:
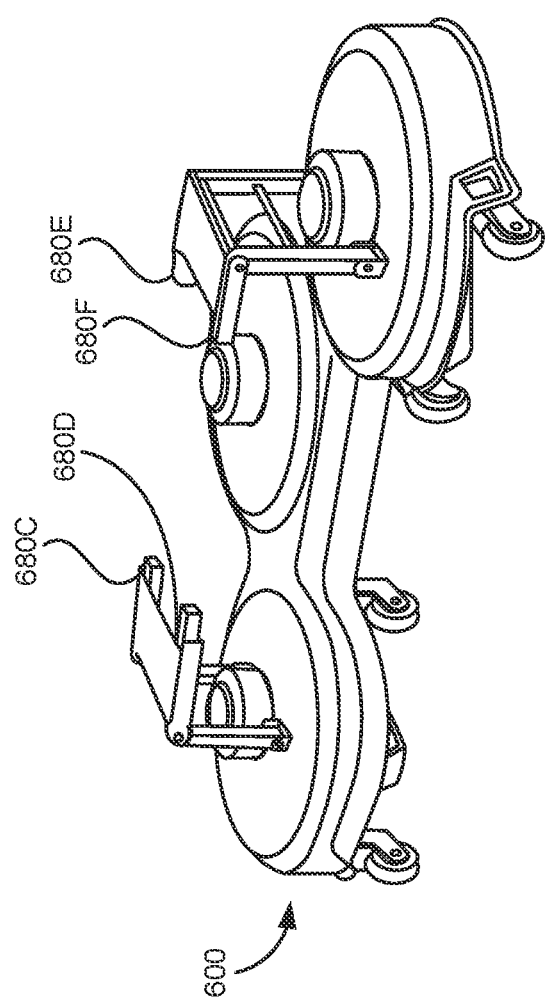

As illustrated in the example shown in FIGS. 8B-8D, a piece of powered equipment 600 to be attached to the TTV 100 may include a first set of attachment ports 680C and 680D at a first lateral side portion of the equipment 600, and a second set of attachment ports 680E and 680F at a second lateral side portion of the equipment 600. The first set of attachment ports 680C and 680D of the equipment 600 may be respectively received in and coupled to, for example, mechanically and electrically coupled to, the attachment ports 180C and 180D at a first lateral side the TTV 100. Similarly, the second set of attachment ports 680E and 680F of the equipment 600 may be respectively received in and coupled to, for example, mechanically and electrically coupled to, attachment ports 180E and 180F at a second lateral side of the TTV 100. In this arrangement, the powered equipment 600 may extend under the TTV 100, so that the powered equipment 600 may be operated by the user in a ride-on mode without obstructing the position of the rider on the TTV 100, and without the operation of the powered equipment 600 posing a hazard to the user while riding on the TTV 100. In some implementations, a piece of powered equipment, or accessory, may be connected to the attachment ports 180C-180F of the TTV, and extend under the TTV 100 in this manner, when the TTV 100 is operated in the walk-behind mode. Numerous different types of powered equipment, or powered accessories, such as, for example, a three-bladed mowing accessory, a sweeping or cleaning accessory, a resurfacing accessory and the like, may be mechanically and electrically coupled to the TTV 100 in the manner described above with respect to FIGS. 8B-8D.

The TTV 100, in accordance with implementations described herein, may be nimble, and relatively in compact size, its high torque drive system producing essentially zero emissions while still providing high capacity materials moving capability, long runtime electric generator functionality for 120V AC powered tools, flexible functionality via the powered accessory attachment ports 180 that allow rapid conversion for multiple different work site tasks. The advantages in size and maneuverability of the TTV 100 may be due in large part to the electric drive system, including the one or more HD battery packs 200 providing power to the brushless direct electric motor 250, coupled with the relatively narrow, three-wheeled design having two front wheel assemblies and a single rear wheel assembly 320, and the cantilevered suspension system. The three wheel design and cantilevered suspension system may produce a relatively tight turning radius, allowing the TTV 100 to move through relatively narrow hallways, passages, aisles, doorways and the like not typically traversed by conventional material moving equipment and/or high output construction equipment.

Figure 9C:
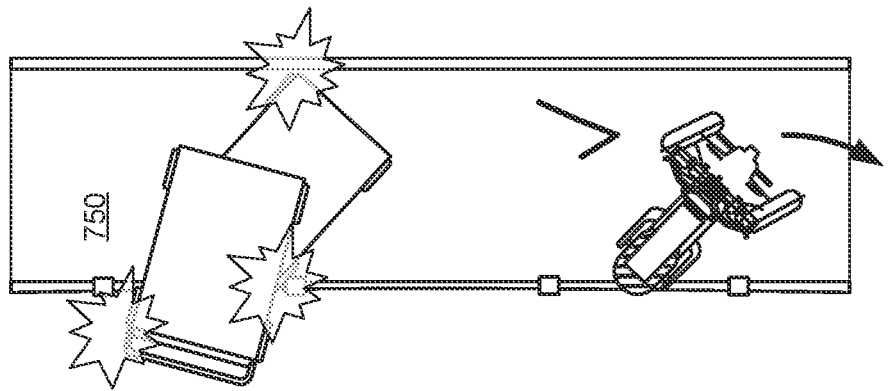
FIGS. 9A-9C illustrate maneuverability of a TTV at an exemplary work site, in accordance with implementations described herein.
Figure 9B:
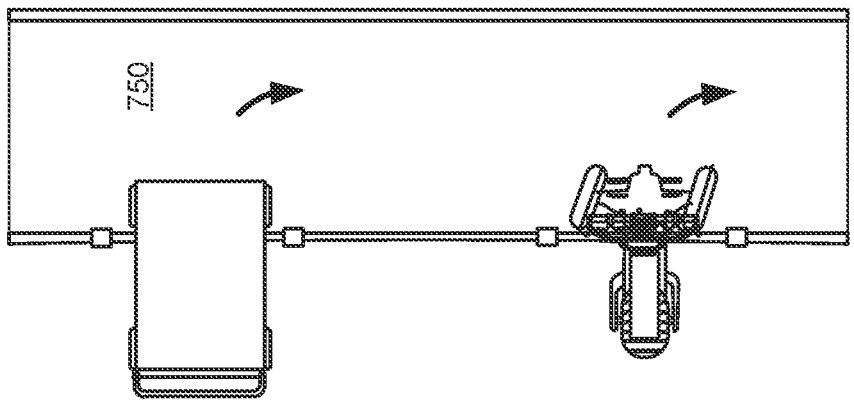
Figure 9A:
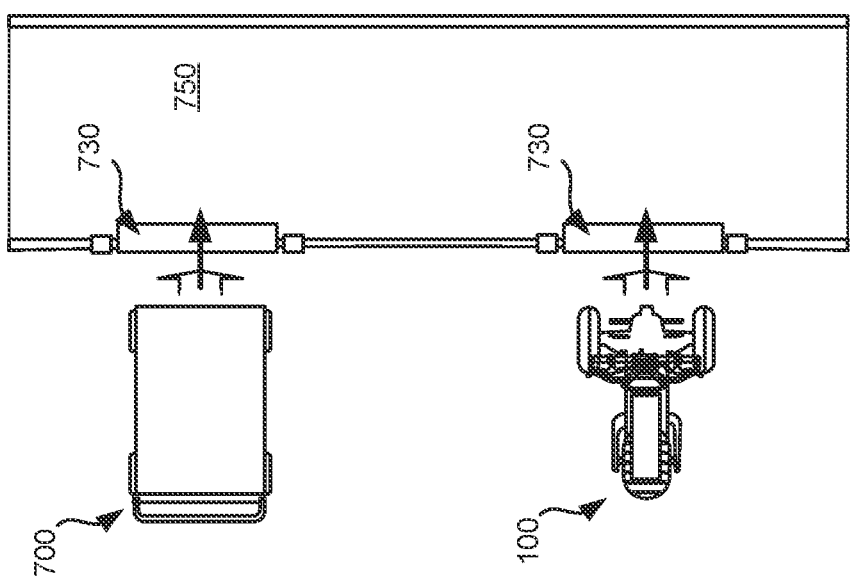

For example, in FIGS. 9A-9C, a piece of conventional material moving equipment 700 is illustrated moving through an opening 730 in a wall of a work site. The opening 730 may be, for example, a standard doorway having a standard doorway dimension of, for example, approximately 34 inches across. As the piece of conventional equipment 700 moves through the standard doorway 730 as shown in FIG. 9A, and executes a turn, into a standard hallway 750 (or passageway, or aisle) as shown in FIGS. 9B and 9C, the standard hallway 750 having a standard dimension of, for example, approximately 48 inches across, right and left lateral sides of the equipment 700 collide with the opening 730 due to, for example, the dimensions of the equipment 700, the turning radius of the equipment 700 and the like. If the equipment 700 is able to get through the doorway 730 and progress into the hallway 750, the equipment 700 may not be able to complete the turn into the hallway 700 without colliding with an opposite wall of the hallway 730, as shown in FIG. 9C. In contrast, the TTV 100, traversing the same standard doorway 730, into the same standard dimension hallway 750, is able to move through the standard doorway 730 without contacting or colliding with the doorway 730 due to the compact size of the TTV 100. The TTV 100 is also able to execute and complete a turn from the standard size doorway 730 into the standard size hallway 750 without contacting or colliding with the walls of the hallway 750 due to the maneuverability of the TTV 100 afforded by the three wheel design with cantilevered suspension.

Figure 10A:
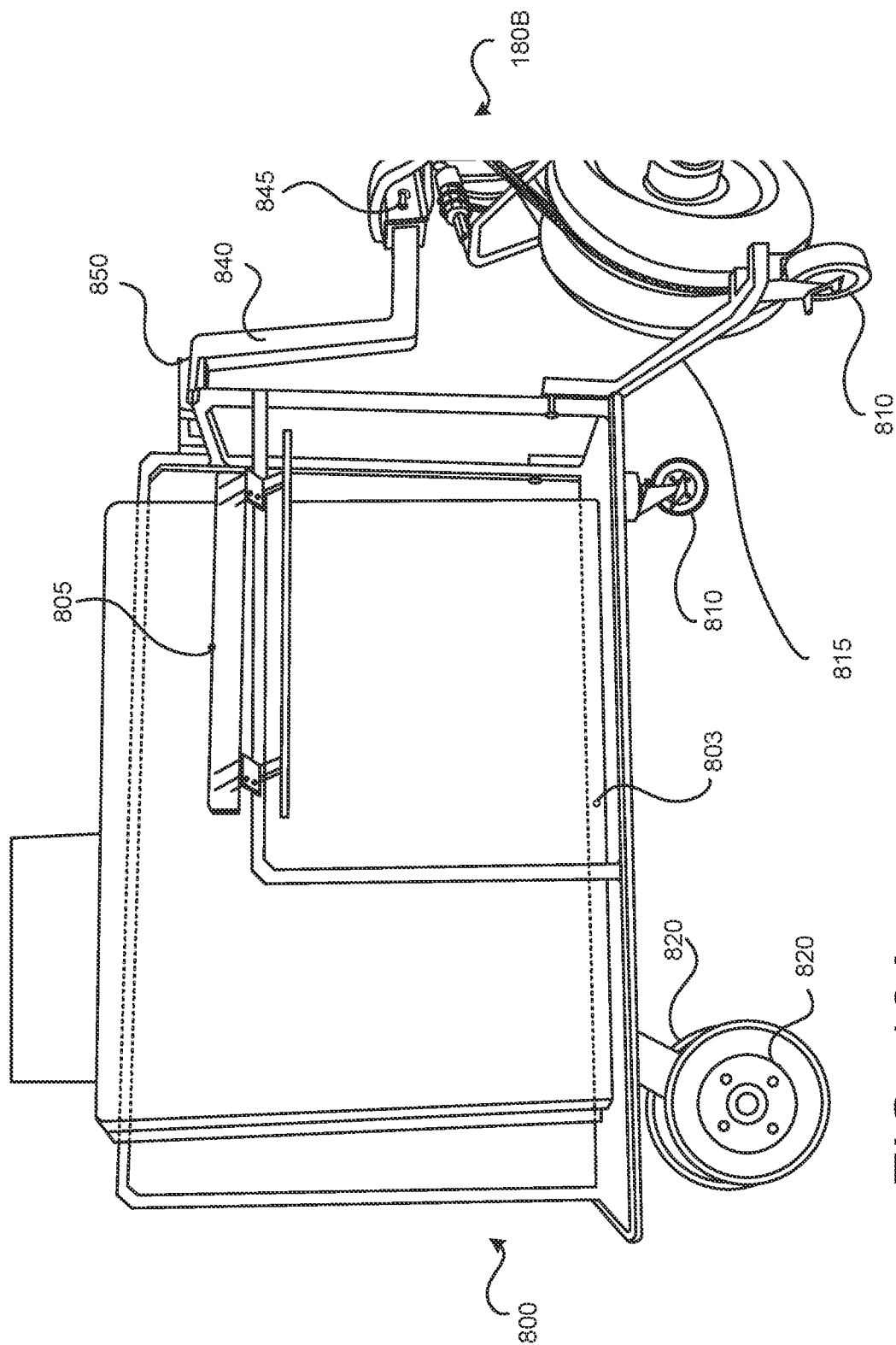
Figure 10B:
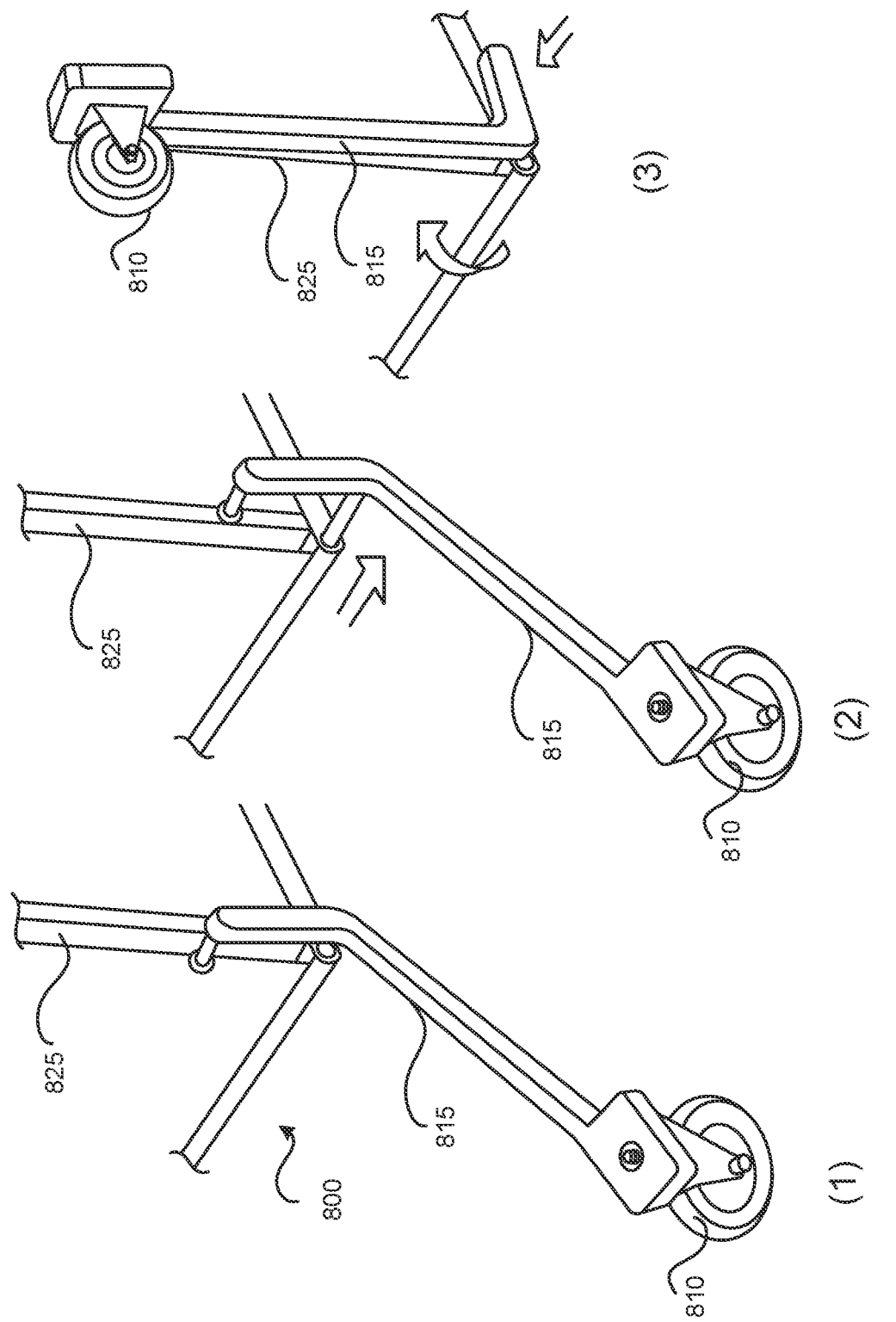
Figure 10C:
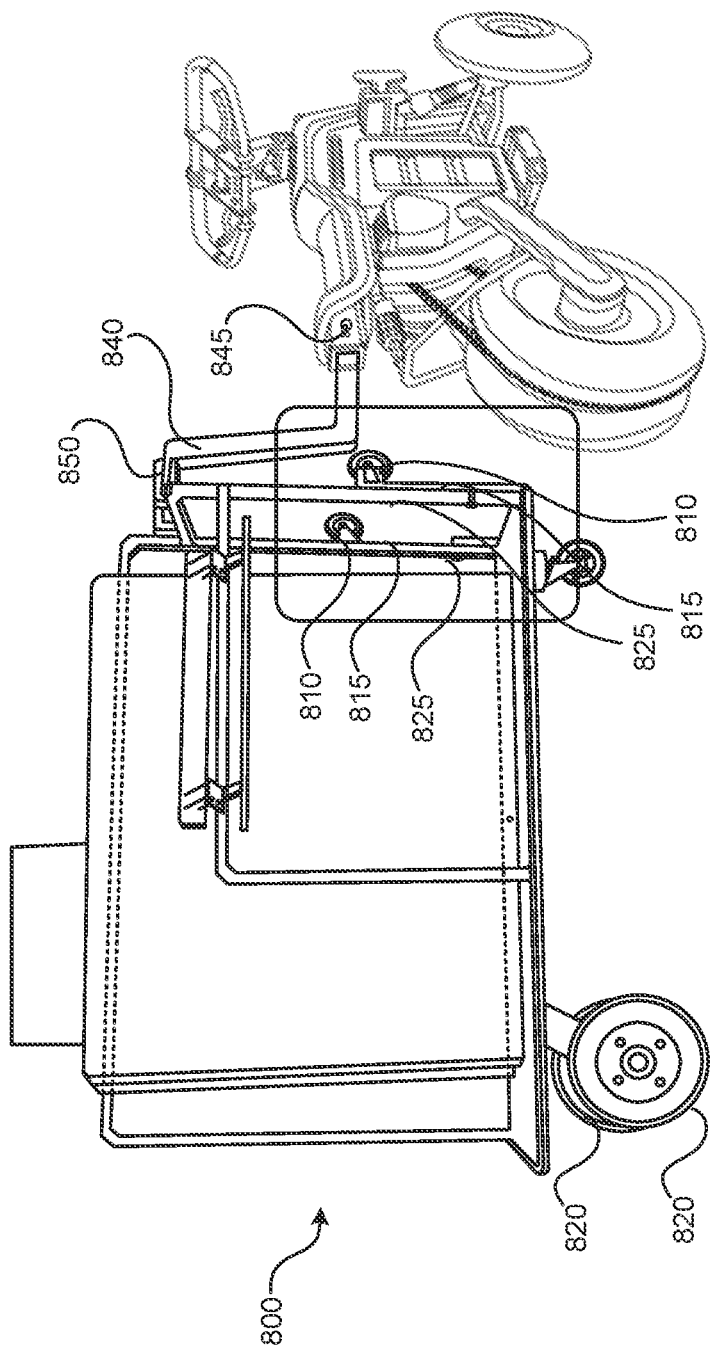

As illustrated in the example shown in FIGS. 10A-10C, one of the numerous accessories that may be attached to the TTV 100 to make use of the maneuverability of the TTV 100 may include a cart 800 configured to move, for example, relatively large sheets of material 803, and other types of cargo which would otherwise be difficult to move manually. These exemplary large sheets of material 803 may be loaded on the cart 800, and secured for transport on the cart 800 by clamps 805. The cart 800 may include a set of front wheels 810, and a set of pivoting rear wheels 820. When standing alone, for example, storing materials, both the front wheels 810 and the rear wheels 820 may be in a down position, as shown in FIG. 10A, to provide for stable loading and storage of materials 803 on the cart 800 when the cart 800 is not attached to the TTV 100.

The cart 800 may be attached to the TTV 100 at, for example, the attachment port 180B, as shown in FIG. 10B. In some implementations, an adapter 840 may extend between the attachment port 180B of the TTV 100, with a locking pin 845 extending through a first end of the adapter 840 to secure the adapter 840 at the attachment port 180B of the TTV 100, and a pivot pin 850 pivotably coupling a second end of the adapter 840 to the cart 800. When attached to the TTV 100 in this manner, the set of front wheels 810 may be rotated up, into a stored position, as shown in FIGS. 10B(1), 10B(2) and 10B(3), and in FIG. 10C. For example, in some implementations, each of the front wheels 810 may be mounted on a front leg member 815 of the cart 800. To move the front wheels 810 from the down position shown in FIG. 10A and FIG. 10B(1), to the stored position shown in FIG. 10B(3) and FIG. 10C, each of the two front leg members 815 may slide outward, away from a frame 825 of the cart 800, as shown in FIG. 10B(2). From the extracted position shown in FIG. 10B(2), each of the front leg members 815 and front wheels 810 may then be rotated up, into the storage position, as shown in FIG. 10B(3) and FIG. 10C. With the two front wheels 810 of the cart 800 in the storage position shown in FIG. 10B(3) and FIG. 10C, and the cart 800 pivotably coupled to the TTV 100 via the adapter 840 and the pivot pin 850, maneuverability of the TTV 100 and cart 800 may be enhanced, particularly in indoor spaces having space and turning limitations due to, for example, doorways, hallway and aisle clearances and the like, as shown in FIG. 10D.

Figure 11A:
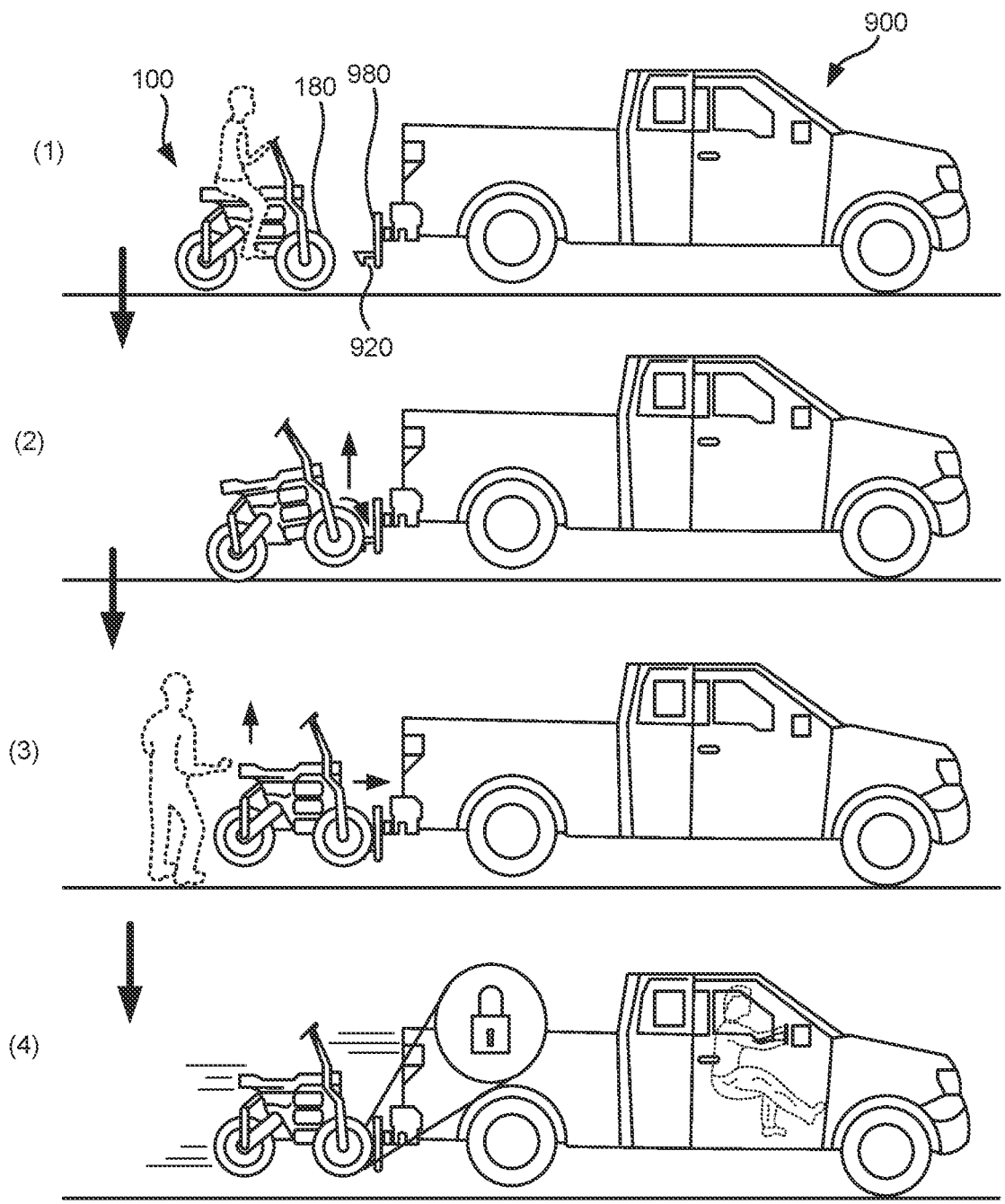
FIGS. 11A-11C illustrate loading and transport of a TTV to an exemplary transport vehicle, in accordance with implementations described herein.

When transporting the TTV 100 over relatively long distances, such as, for example, highway distances, between work sites, and the like, the TTV 100 may be relatively easily attached to and detached from a transport vehicle, such as, for example, a standard sized truck, by a single user, without the need for hoists, ramps and the like which may be associated with this type of movement of conventional high output construction equipment and/or material moving equipment. FIG. 11A illustrates manual attachment of the TTV 100 to a hitch attachment on the back of a transport vehicle, and FIG. 11B illustrates automated attachment of the TTV 100 to the hitch attachment on the back of the transport vehicle.

Figure 11B:
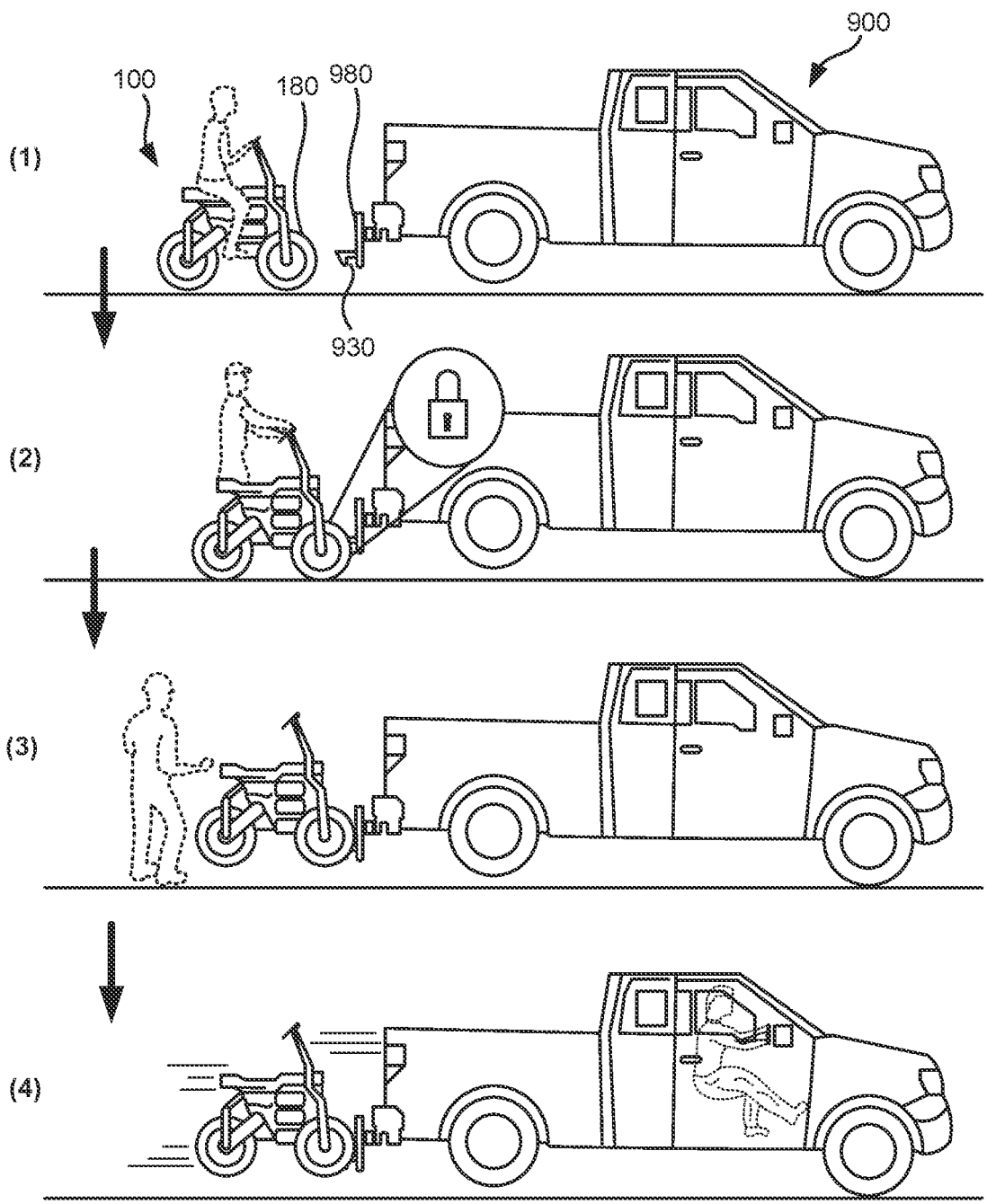
Figure 11C:
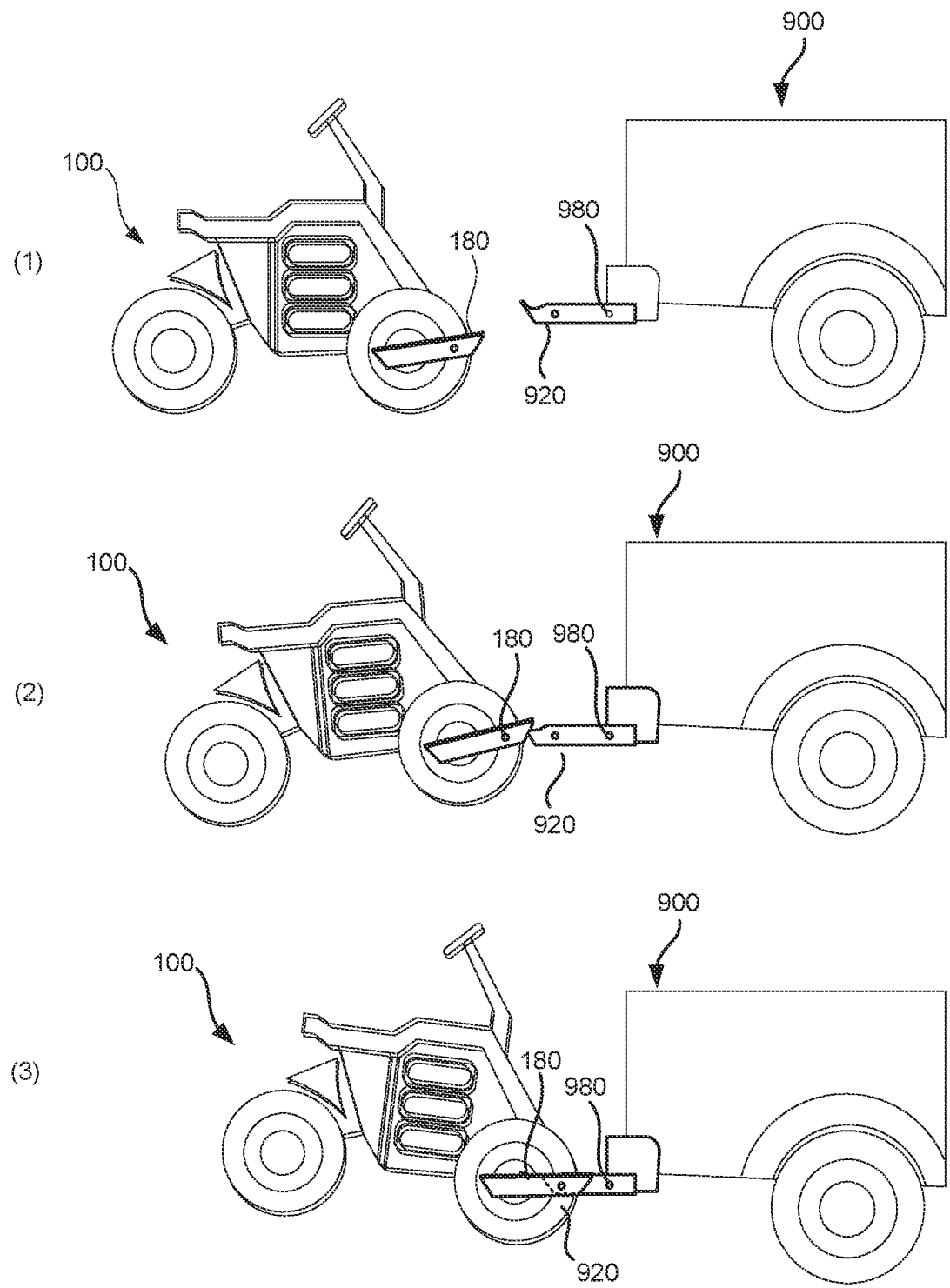

As shown in FIG. 11A(1), the user may move the TTV 100, for example, ride the TTV 100, to the transport vehicle 900, to couple the TTV 100 to the transport vehicle 900 via, for example, a hitch attachment 980 on the transport vehicle 900 (see also, FIG. 11C(1), which illustrates the attachment port 180A and the hitch attachment 980, along with an adapter 920/930 extending between the attachment port 180A and the hitch attachment 980, in shadow). Once at the transport vehicle 900, the user may lift one end, for example, the forward end, of the TTV 100 to align one of the attachment ports 180 of the TTV 100, for example, the first attachment port 180A, with the hitch attachment 980 on the transport vehicle 900, as shown in FIG. 11A(2) (see also, FIG. 11C(2)). Once aligned in this manner, with, for example, the hitch attachment 980 on the transport vehicle 900 received in the attachment port 180A on the TTV 100, the user may then lift the opposite end, for example, the aft end, of the TTV 100, and move the TTV 100 in the direction of the transport vehicle 900 to complete the coupling of the TTV 100 to the transport vehicle 900 via connection of the attachment port 180A and the hitch attachment 980, as shown in FIG. 11A(3) (see also, FIG. 11C(3)). In some implementations, this coupling of the attachment port 180A of the TTV 100 and the hitch attachment 980 on the transport vehicle 900 may include insertion of a coupling adapter 920 between the attachment port 180A and the hitch attachment 980, to provide for secure structural and mechanical coupling of the TTV 100 to the transport vehicle 900. In some implementations, coupling of the TTV 100 to the transport vehicle 900 via the attachment port 180A and the hitch attachment 980 may also include establishing an electrical connection between terminals in the attachment port 180A and terminals in the hitch attachment 980. In some implementations, coupling of the TTV 100 to the transport vehicle 900 via the attachment port 180A and the hitch attachment 980 may also include engaging a latching mechanism between the attachment port 180A on the TTV 100 and the hitch attachment 980 on the transport vehicle 900, via, for example, the coupling adapter 920 extending between the attachment port 180A and the hitch attachment 980, or directly between the attachment port 180A on the TTV 100 and the hitch attachment 980 (see, for example, FIG. 11C (3)). This may allow the TTV 100 to be securely attached to the transport vehicle 900, so that the user may then transport the TTV 100 over longer distances when necessary, as shown in FIG. 11A(4).

As shown in FIG. 11B, to attach the TTV 100 to the transport vehicle 900 in an automated manner, the user may move the TTV 100, for example, ride the TTV 100, to the transport vehicle 900, to couple the TTV 100 to the transport vehicle 900 via, for example, the hitch attachment 980 on the transport vehicle 900, as shown in FIG. 11B(1). Once at the transport vehicle 900, the user may align one end, for example, the forward end, of the TTV 100, with the hitch attachment 980 on the transport vehicle 900, and in particular, with an adapter 930 coupled to the hitch attachment 980, coupling the TTV 100 to the hitch attachment 980 via the attachment port 180A and the adapter 930, as shown in FIG. 11B(2). As noted above, connection of the TTV 100 to the hitch attachment 980 may include both a mechanical engagement between the attachment port 180A and the hitch attachment 980, including engagement of a latching mechanism between the attachment port 180A and the hitch attachment 980, and electrical engagement between the attachment port 180A and the hitch attachment 980. Once coupled and engaged in this manner, the user may actuate a lift mechanism, which may be powered by one or more of the battery packs 200 on the TTV 100, to lift the TTV 100 off the ground, as shown in FIG. 11B(3). With the TTV 100 securely attached to the transport vehicle 900, the user may then transport the TTV 100 over longer distances when necessary, as shown in FIG. 11B(4).

In some implementations, the TTV 100 may be attached and secured to the transport vehicle 900 for transport in a suspended, or cantilevered manner, in which neither the front wheel assemblies 330 nor the rear wheel assembly 320 contact the ground, as shown in FIGS. 11A-11C. In some implementations, the TTV 100 may be attached to the transport vehicle 900 so that one or more of the wheel assemblies, for example, the rear wheel assembly 320 (connected to the motor 250 via the power transmission device 310), contacts the ground. When connected in this manner for transport, as the transport vehicle 900 moves to transport the TTV 100, the rear wheel assembly 320 may rotate in response to movement of the transport vehicle 900, allowing for regenerative charging of one or more of the battery packs 200 during transport.

A TTV, in accordance with implementations described herein, may deliver a relatively large amount of power to wherever power is needed, without generating hazardous fumes and/or without the need for extension cords to deliver power from remote sources. The compact size and nimble three-wheel suspension of the TTV, coupled with the ruggedized design of the TTV, may allow the TTV to traverse a wide variety of work sites and/or terrain, from standard sized doorways, hallways, elevators and the like, to an excavation site, without the assistance of ancillary equipment such as cranes, hoists and the like. Multiple powered attachment ports on the TTV allowing for both mechanical and electrical attachment of a wide variety of accessories may provide flexible capability and functionality in a single vehicle, with conversion between a ride-on mode and a walk-behind mode, and a corresponding conversion in motor operation, lending additional capability and flexibility.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combi-

What is claimed is:

1. A vehicle, comprising:
a frame;
an electric motor coupled to the frame;
at least one battery pack received in a receptacle in the frame;
a first axle and a second axle coupled to the frame;
a first wheel assembly and a second wheel assembly coupled to opposite end portions of the first axle;
a third wheel assembly coupled to the second axle;
a power transmission device coupled between the electric motor and at least one of the first axle or the second axle and configured to transmit a force generated by the motor to the at least one of the first axle or the second axle; and
a plurality of powered attachment ports provided on the frame, wherein each of the plurality of powered attachment ports is configured be mechanically and electrically coupled with a piece of accessory equipment, and each of the plurality of powered attachment ports are configured to selectively receive power from the at least one battery pack to provide output power at a voltage of at least 120V alternating current (AC) or at least 380V direct current (DC) to the piece of accessory equipment coupled thereto.

2. The vehicle of claim 1, wherein the at least one battery pack includes a first high power density (HD) battery pack, a second HD battery pack, and a third HD battery pack carried on the frame.

3. The vehicle of claim 2, wherein the first, second and third HD battery packs are configured to output 240V DC to 380V DC power to the electric motor, and to simultaneously output 240V DC to 380V DC power to one or more powered attachment ports of the plurality of powered attachment ports based on detection of a powered piece of accessory equipment coupled to the one or more of the plurality of powered attachment ports.

4. The vehicle of claim 3, further comprising a plurality of power sockets on the first, second and third HD battery packs, wherein the first, second and third HD battery packs are configured to output 120V AC power to one or more power sockets of the plurality of power sockets based on detection of a plug, connected to a piece of equipment, received in the one or more power sockets.

5. The vehicle of claim 4, wherein the first, second and third HD battery packs are configured to output AC power to the one or more power sockets, and to simultaneously provide DC power to the electric motor via the power transmission device or to the one or more powered attachment ports.

6. The vehicle of claim 1, wherein the at least one battery pack is a high power density (HD) battery configured to output 240V DC to 380V DC power in a first mode, and to output 120V AC power in a second mode.

7. The vehicle of claim 6, wherein the at least one battery pack is configured to output 240V DC to 380V DC power to the engine, and is configured to simultaneously and selectively provide 240V DC to 380V DC power or 120V AC power to each of the plurality of attachment ports based on an identification of the piece of accessory equipment respectively coupled therein.

8. The vehicle of claim 6, further comprising at least one power socket on the at least one battery pack or on the frame, wherein the at least one power socket is configured to receive a plug therein, and to provide 120V AC power to a piece of equipment connected to the plug.

9. The vehicle of claim 6, wherein the at least one battery pack includes a plurality of high power density battery packs, and wherein,
in a first mode, each battery pack of the plurality of battery packs is dedicated to supplying one of AC power or DC power, and
in a second mode, DC power is drawn simultaneously from multiple battery packs of the plurality of battery packs, and the supply of DC power from one or more of the multiple battery packs of the plurality of battery packs is interrupted in response to a demand for AC power.

10. The vehicle of claim 1, further comprising a control panel coupled to the frame, the control panel including a plurality of manipulation devices configured to receive user inputs for controlling operation of the vehicle and operation of accessories attached to the vehicle at the plurality of powered attachment ports.

11. The vehicle of claim 10, wherein the vehicle is operable in a riding mode in which the user is received on a seat positioned on the frame, and in a walk-behind mode in which the vehicle is configured to be operated by the user walking adjacent to the vehicle.

12. The vehicle of claim 11, wherein the control panel is rotatably coupled to the frame such that a rotation of the control panel, from a first position relative to the frame to a second position relative to the frame, triggers a conversion from operation of the vehicle in the riding mode to operation of the vehicle in the walk-behind mode.

13. The vehicle of claim 12, wherein, in the riding mode, the motor is configured to operate in a high speed/low torque mode, in a high speed/high torque mode, in a low speed/low torque mode, or in a low speed/high torque mode, in response to a user input received at the control panel.

14. The vehicle of claim 12, wherein, in the walk-behind mode, the motor is configured to operate in a low speed/high torque mode, or in a low speed/low torque mode, in response to a user input received a the control panel.

15. The vehicle of claim 1, further comprising a towing adapter configured to mount the vehicle to a hitch attachment of a transport vehicle, the towing adapter including first end configured to be received in one of the plurality of powered attachment points, and a second end configured to be received in the hitch attachment of the transport vehicle.

16. The vehicle of claim 15, the towing adapter including a latching mechanism configured to engage in response to insertion of the second end of the towing adapter into the hitch attachment of the transport vehicle.

17. The vehicle of claim 16, wherein, with second end of the towing adapter inserted into the hitch attachment of the transport vehicle and the latching mechanism engaged, the vehicle is suspended from the hitch attachment of the transport vehicle.

18. The vehicle of claim 16, wherein, with second end of the towing adapter inserted into the hitch attachment of the transport vehicle and the latching mechanism engaged, the vehicle, only the third wheel assembly contacts the ground, wherein rotation of the third wheel assembly in response to towing movement of the transport vehicle produces regenerative charging of the at least one battery.

19. The vehicle of claim 1, wherein the frame, first and second wheel assemblies coupled to the first axle, and third wheel assembly coupled to the second axle, define a three-wheeled cantilevered suspension system.

20. The vehicle of claim 19, wherein, in a ride-on mode of the vehicle, a seat configured to receive a user seated thereon is positioned such that the first axle and first and second wheel assemblies coupled thereto are located at a forward end portion of the vehicle, and the second axle and the third wheel assembly coupled thereto are positioned at an aft end portion of the vehicle.

\* \* \* \* \*